US010865997B2

(12) United States Patent
Keber

(10) Patent No.: US 10,865,997 B2
(45) Date of Patent: *Dec. 15, 2020

(54) ZONE CONTROL WITH MODULATING BOILER

(71) Applicant: Watts Regulator Co., North Andover, MA (US)

(72) Inventor: Micheal Keber, Lake Country (CA)

(73) Assignee: WATTS REGULATOR CO., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,696

(22) Filed: Oct. 7, 2019

(65) Prior Publication Data

US 2020/0200398 A1 Jun. 25, 2020

Related U.S. Application Data

(63) Continuation of application No. 15/708,359, filed on Sep. 19, 2017, now Pat. No. 10,465,920.

(Continued)

(51) Int. Cl.
*F24D 19/10* (2006.01)
*F24D 3/02* (2006.01)
(Continued)

(52) U.S. Cl.
CPC ........... *F24D 19/1048* (2013.01); *F24D 3/02* (2013.01); *F24D 10/003* (2013.01);
(Continued)

(58) Field of Classification Search
CPC ............ F24D 19/1048; F24D 19/0075; F24D 19/0012; F24D 10/003; F24D 3/02;
(Continued)

(56) References Cited

U.S. PATENT DOCUMENTS

| 4,337,893 A | 7/1982 | Flanders et al. |
| 4,582,249 A | 4/1986 | Nelson |

(Continued)

FOREIGN PATENT DOCUMENTS

| EA | 016524 | 5/2012 |
| WO | 2012061795 | 5/2012 |

OTHER PUBLICATIONS

International Search Report and Written Opinion for international application No. PCT/US2016/044748 dated Nov. 10, 2016, 7 pages.

*Primary Examiner* — Ziaul Karim
(74) *Attorney, Agent, or Firm* — Burns & Levinson LLP; George Chaclas; Daniel McGrath

(57) ABSTRACT

A zone controller works with a modulating unit comprising memory storing an instruction set and data related to thermostats, a plurality of duty cycles for a plurality of zones, a plurality of time periods for the plurality of zones, and a maximum zone load. A processor is operative to provide a modulating signal to the modulating unit based on the maximum zone load. The modulating signal determines operation of the modulating boiler and the maximum zone load based on the plurality of duty cycles, time periods, and data related to thermostats. The zone controller may be further operative to: calculate a first duty cycle for the first zone based on a first time period; calculate a second duty cycle for the second zone based on a second time period; and determine a maximum zone load, which is a greater of the first duty cycle and the second duty cycle.

10 Claims, 17 Drawing Sheets

Related U.S. Application Data

(60) Provisional application No. 62/396,511, filed on Sep. 19, 2016.

(51) Int. Cl.
  *F24D 10/00* (2006.01)
  *F24D 19/00* (2006.01)
  *G05B 19/042* (2006.01)

(52) U.S. Cl.
  CPC ..... *F24D 19/0012* (2013.01); *F24D 19/0075* (2013.01); *G05B 19/042* (2013.01); *F24D 2200/04* (2013.01); *F24D 2220/0292* (2013.01); *F24D 2220/042* (2013.01); *F24D 2240/00* (2013.01); *G05B 2219/2614* (2013.01); *Y02B 30/17* (2018.05)

(58) Field of Classification Search
  CPC .......... F24D 2240/00; F24D 2220/042; F24D 2220/0292; F24D 2200/04; G05B 19/042; G05B 2219/2614; Y02B 30/17
  See application file for complete search history.

(56) References Cited

U.S. PATENT DOCUMENTS

| | | |
|---|---|---|
| 4,843,084 A | 6/1989 | Parker et al. |
| 5,024,265 A | 6/1991 | Buchholz et al. |
| 5,192,020 A | 3/1993 | Shah |
| 5,971,284 A | 10/1999 | Hammer |
| 6,711,471 B2 | 3/2004 | Kidder |
| 7,644,869 B2 | 1/2010 | Chen |
| 9,657,959 B2 * | 5/2017 | Sullivan ................ F24F 1/0007 |
| 2009/0001186 A1 | 1/2009 | Cohen |
| 2009/0118872 A1 * | 5/2009 | Nonaka .............. G05D 23/1934 700/285 |
| 2009/0280475 A1 * | 11/2009 | Pollack ................ C12Q 1/6869 435/6.11 |
| 2015/0108230 A1 | 4/2015 | Cloonan et al. |
| 2015/0153057 A1 * | 6/2015 | Matsuoka ............... G05B 15/02 700/278 |
| 2017/0234562 A1 * | 8/2017 | Ribbich ............. G05D 23/1923 700/277 |

* cited by examiner

ZONE CONTROL WITH MODULATING BOILER

CROSS-REFERENCE TO RELATED APPLICATION

This application claims priority to and is a continuation of U.S. patent application Ser. No. 15/708,359, filed Sep. 19, 2017, which claimed priority and the benefit of U.S. Provisional Patent Application No. 62/396,511, filed Sep. 19, 2016, each of which are incorporated herein by reference.

FIELD OF THE INVENTION

The subject disclosure relates to methods for operation of heating systems, and more particularly to improved zone control for modulating boilers.

BACKGROUND OF THE INVENTION

Traditional heating and cooling systems have been quite simple in commercial and residential buildings. For example, a heating system consisted of a central heating unit that connected to a distribution network of vents or pipes distributed throughout the structure. To control the central unit, a thermostat is located in the temperature control area with a manually adjusted setpoint to call for a higher or lower temperature. As technology advanced, systems became more complex such as shown in U.S. Pat. No. 5,024,265 issued to Bucholz et al. on Jun. 18, 1991, U.S. Pat. No. 5,971,284 issued to Hammer on Oct. 16, 1999, and U.S. Pat. No. 6,711,471 issued to Kidder on Mar. 23, 2004.

The simplest hydronic multi-zone heating systems using non-communicating thermostats simply turn on a boiler and circulators whenever any thermostat calls for heat. The boiler target is set to a fixed value sufficient to meet heating requirements during the coldest days of the year. This system is inefficient in that it results in a boiler maintaining temperatures that are much higher than required for heating during most of the year.

One improvement is to install an outdoor reset control on the boiler. When an outdoor reset control is installed, the boiler operates at a target temperature that is calculated based on the current outdoor temperature. Thus, high targets are calculated during cold outdoor temperatures and lower targets are calculated during mild outdoor temperatures. Controls typically include settings for a minimum target, a maximum target, and the amount of target change vs. outdoor temperature change (known as the "heating curve").

The disadvantage of these outdoor reset systems is the requirement of a first sensor to measure and supply temperature, a second sensor to measure the outdoor temperature, and the configuration of several settings to operate properly. Further, the heating requirements for a given area may differ depending on a number of factors, such as size of the area, insulation of the area, heat generated by people and appliances, and radiant heat from the sun on the outside of the building, to name a few. Therefore relying solely on outdoor thermostats to calculate a boiler target temperature can result in a target temperature that is lower or higher than necessary, again creating an inefficient system and/or discomfort.

SUMMARY OF THE INVENTION

In view of the above, a need exists for systems, methods and devices that utilize modulated supplies to efficiently operate heating and/or cooling systems.

In one embodiment, the present disclosure is directed to a zone controller for a system in communication with a modulating unit comprising memory storing an instruction set and data related to thermostats, a plurality of duty cycles for a plurality of zones, a plurality of time periods for the plurality of zones, and a maximum zone load. A processor is in communication with the memory for running the instruction set. The processor is operative to provide a modulating signal to the modulating unit based on the maximum zone load, wherein the modulating signal determines operation of the modulating boiler and the maximum zone load is based on the plurality of duty cycles, time periods, and data related to thermostats. Preferably, the modulating unit is selected from the group consisting of a modulating boiler and an air conditioner with compressor modulation. The zone controller may be further operative to: calculate a first duty cycle for the first zone based on a first time period; calculate a second duty cycle for the second zone based on a second time period; and determine a maximum zone load, which is a greater of the first duty cycle and the second duty cycle. The zone controller may be still further operative to: modulate at least one of an operating temperature of the modulating boiler and a flow to each of the zones; and/or: calculate the time period for each zone based on empirical data and a new maximum zone load is calculated whenever a new individual zone load is calculated.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION OF PREFERRED EMBODIMENTS

Figure 1:
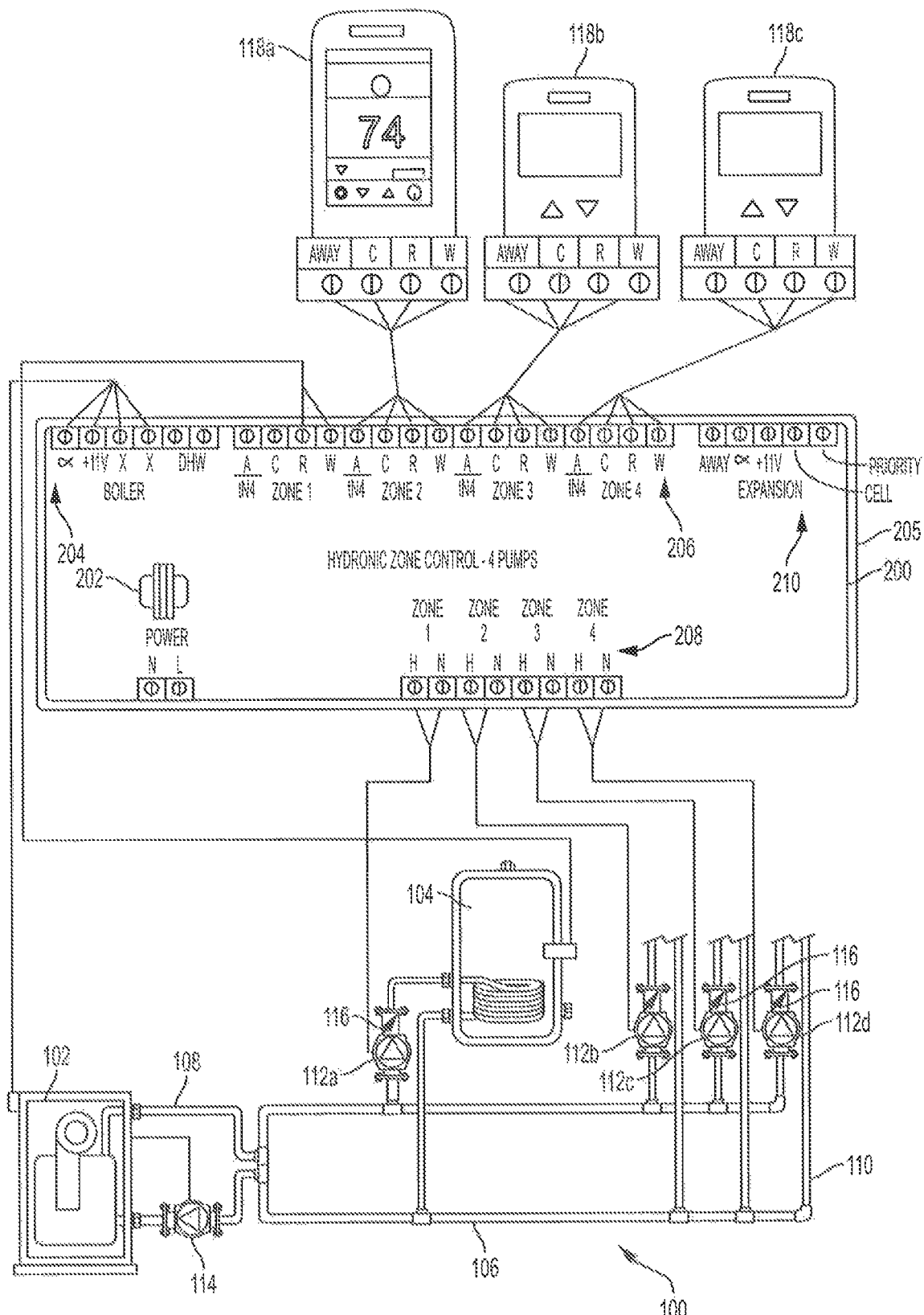
FIG. 1 is a diagram showing a hydronic heating system in accordance with the subject technology.

The subject technology overcomes many of the prior art problems associated with floor warming systems. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring now to FIG. 1, a schematic diagram of a hydronic heating system 100 for a building in accordance with the subject technology is shown. The heating system 100 efficiently provides heat throughout a building. In the embodiment shown, the hydronic heating system 100 can provide hydronic heat to four different areas within the building. While a four zone heating system 100 is shown, one skilled in the art would recognize that the subject technology could be implemented with any number of zones for corresponding areas throughout a building or complex. The hydronic heating system 100 utilizes a modulating boiler 102. While traditional boilers typically operate at a fixed setpoint and cycle between 100% and 0% heat output to maintain the setpoint, a modulating boiler 102 can accept a signal (e.g., 0-10 Vdc or 4-20 Vdc), which determines either the heat output of the boiler and/or the target output temperature. Thus, in times when less heat is required, the modulating boiler 102 may operate at a target temperature which requires less than the maximum output of the boiler 102 to conserve energy and maximize comfort for a user. Any type of modulating boiler may be used in the subject technology such as a modulating fire, on-off, hi-low, multi-stage firing and the like.

The modulating boiler 102 is connected to a domestic hot water heat exchanger 104 and other components by a network 106 of pipes as would be expected in a residential environment. The pipe network 106 includes a supply path 108 and a return path 110 as is known in the art. Supply pumps 112a-d are connected in the supply path 108 for moving fluid therethrough. A return pump 114 in the return path 110 provides efficient movement of the fluid to restore the heating fluid to the modulating boiler 102 as well. The pipe network 106 also includes heat distribution elements (not shown) connected to the pipe network 106 for distributing the heat in the building areas. The heat distribution elements may be radiators, coils in flooring and the like now known and later developed.

In the hydronic heating system 100, there are four zones. The first zone is for domestic hot water (DMH), whereas zones 2-4 are for heat. Each supply pump 112a-d corresponds to a zone. In other words, each supply pump 112a-d is a designated supply pump for pumping water from the modulating boiler into the heat exchanger 104 or the respective zone area as the case may be. The supply pumps 112a-d have check valves 116 as needed to reduce or eliminate backflow from the heat distribution elements towards the modulating boiler 102. A zone controller 200 is in electrical communication with the modulating boiler 102, heat exchanger 104, and pumps 112a-d to control the operation thereof. The zone controller 200 is also in electrical communication with thermostats 118a-c, which measure a temperature in the respective area. The thermostats 118a-c may be the same or different. Still further, the zone controller 200 also receives a signal from the domestic hot water heat exchanger 104. It is envisioned that the communication between components may be wired, wireless and combinations thereof. The thermostats 118a-c can be any variety of device commercially available or a custom version specifically matched to the zone controller 200.

When a thermostat 118 falls below a lower parameter for that area, the thermostat 118 sends a call for heat for that area to the zone controller 200. The thermostats 118 are typical on/off thermostats. When a thermostat 118 is calling for heat, the thermostat 118 is considered as having an "on" status. The zone controller 200 receives the call for heat from a thermostat and sends a signal to the modulating boiler 102 to turn on if the modulating boiler 102 was not already on. The modulating boiler 102 is turned on to run at, or substantially near, a target temperature based on a number of criteria, as detailed more fully below. When the modulating boiler 102 is turned on, the modulating boiler 102 heats the heating fluid (e.g. water). The zone controller 200 also activates the designated supply pump 112 for the area from which the call for heat issued. The designated supply pump 112 forces the hot water from the modulating boiler 102 to the associated heat distribution elements in the pertinent area via the pipe network 106.

The zone controller 200 preferably is a compact unit contained in a housing 205 for easy mount and electrical connection such as on a building panel. The zone controller 200 has a power switch 202 for turning the unit on and off. Electrical connections to the zone controller 200 can be made in any manner. Preferably for electrical connections, the zone controller 200 includes a boiler output section 204, a zone input section 206, a pump control section 208, and an expansion section 210. Indicator lights and various other components as desired may be included in the zone controller design as discussed below with respect to FIG. 2A. The zone controller 200 typically includes one or more custom printed circuit boards (not shown) and other components to accomplish the function and methods disclosed herein.

In one embodiment, the zone controller 200 is a microprocessor-based module designed to operate three or more modulating boilers. The zone controller 200 can provide either outdoor reset and setpoint operation or outdoor reset and domestic hot water (DHW) operation. The zone controller 200 can provide either sequential or parallel modulation. The zone controller 200 also operates the system pumps and individual boiler pumps. The zone controller 200 provides either a 0-20 mA or 4-20 mA signal to each boiler. A contact is also available for either a combustion air damper or external alarm. The zone controller 200 can provide outdoor reset using an outdoor sensor or the control can accept a 0-10 V (dc) signal to establish the required water temperature.

Figure 2:
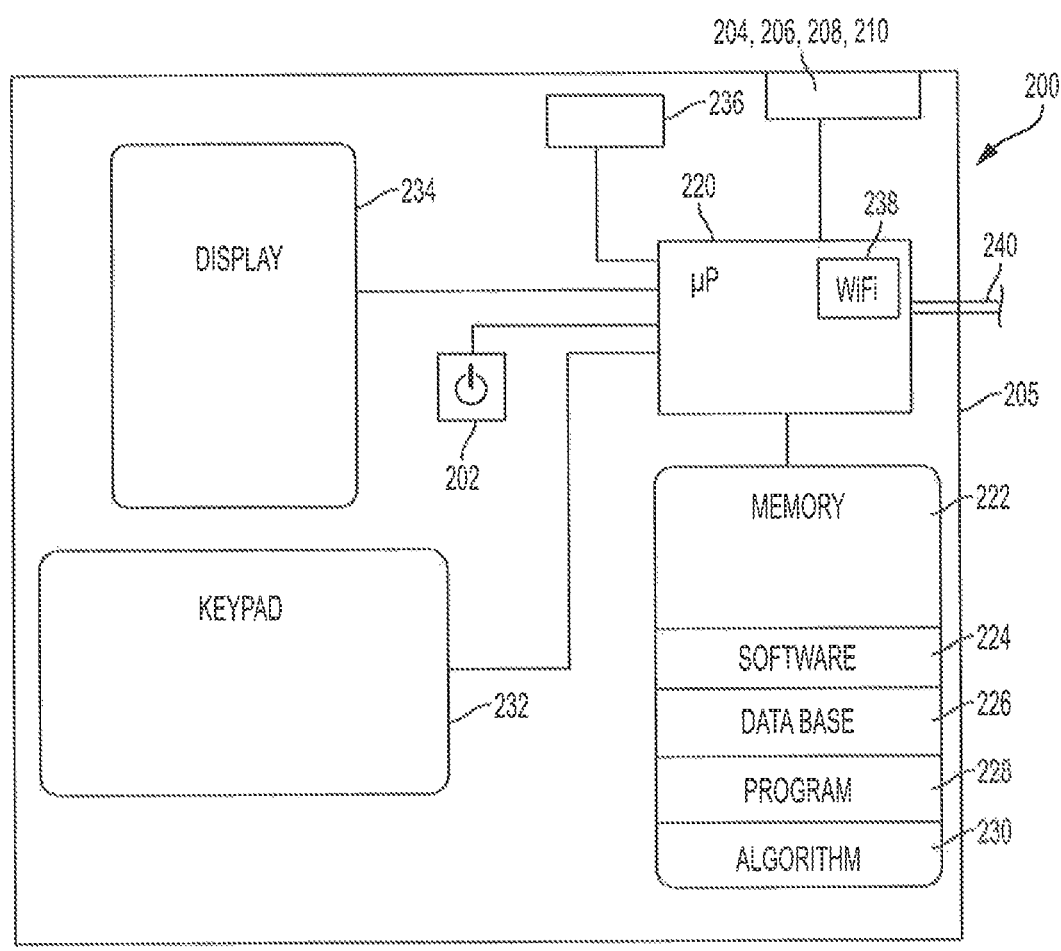
FIG. 2 is a block diagram of a hydronic zone controller implemented in accordance with the subject disclosure.

Referring now to FIG. 2, a somewhat schematic block diagram of a zone controller 200 in accordance with the subject technology is shown. The zone controller 200 includes one or more digital data processing devices particularly suited to work in various embodiments of the subject technology. The zone controller 200 can include a printed circuit board with components for receiving, processing, displaying, and/or transmitting digital and/or analog data. In one embodiment, the zone controller 200 includes an application specific integrated circuit (ASIC) with firmware.

The zone controller 200 includes a processor 220, which is generally logic circuitry that responds to and processes instructions. The processor 220 can include, without limitation, a central processing unit, an arithmetic logic unit, an application specific integrated circuit, a task engine, and/or any combinations, arrangements, or multiples thereof. The processor 220 is in communication with memory 222. Typical memory 222 includes random access memory (RAM), rewritable flash memory, read only memory (ROM), mechanisms and structures for performing I/O operations, and a storage medium such as a magnetic hard disk drive(s). The memory 222 may be a combination of integral and external memory. The memory 222 includes software 224 and a plurality of modules 226, 228, 230 as needed to perform the functions of the subject technology.

For example, the software 224 may include an operating system for execution on the processor 220. Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory.

A module is a functional aspect, which may include software and/or hardware. Typically, a module encompasses the necessary components to accomplish a task. It is envisioned that the same hardware (e.g., memory and processor) could implement a plurality of modules and portions of such hardware being available as needed to accomplish the task.

For example, a database module 226 creates, stores, and maintains data and multiple databases necessary for the proper operation of the subject technology. A program module 228 stores an instruction set to allow the operator to program operation of the zone controller 200. An algorithm module 230 stores an instruction set to allow the processor to apply one or more algorithms to operation of the zone controller 200 as well as vary the actual algorithms according to user input.

The zone controller 200 also has input and output devices such as a keypad 232 and display 234, respectively. The keypad 232 may have any number of buttons, dials, selector switches and the like as necessary to accomplish operation in accordance with the subject technology. Similarly, the display 234 may have a plurality of different screens. Each screen may have areas that display information as icons, graphics, numbers, letters, and the like, as necessary to accomplish operation in accordance with the subject technology. The power switch 202 is also generally an input device.

The zone controller 200 also includes various other circuitry 236 (not drawn distinctly) as needed for proper operation. For example, the circuitry 236 may include integral A/D conversion circuitry, an integral display driver, a peripheral eeprom (non-volatile rewriteable memory for storing user settings and the like), an external flash memory chip (for in-field software updates), and an external WIFI radio which includes built-in IP stack and WIFI encryption functionality.

Still referring to FIG. 2, the zone controller 200 also includes a WiFi module 238 and/or wired communication channels 240 to facilitate communication with external sensors, networks, devices, elements and the like. The zone controller 200 also has the connector panel sections 204, 206, 208, 210 as noted above. Although drawn as part of the processor 220, the WiFi module 238 may be separate or otherwise incorporated into the hydronic heating system 100. Similarly, those of ordinary skill will recognize that the hardware, software, modules, sensors, elements, devices and various processes discussed herein are merely exemplary of the functionality performed by the disclosed technology and thus such hardware and processes (and/or their equivalents) may be implemented in commercial embodiments in various combinations without materially affecting the operation of the disclosed technology.

It is also envisioned that the zone controller 200 and/or other components may be incorporated into a more comprehensive home/site controller that controls the operation of additional systems (e.g., air conditioning) along with additional components and sensors (e.g., outdoor lighting, refrigerator compressor sensor etc.) and the like. Several features of the zone controller may be incorporated into the thermostats and vice versa. The zone controller may also be simplified when more function is moved to the thermostats. For example, the zone controller may mount in a basement, which is inconvenient to access. As such, the thermostats would be configured with keypads, displays and functionality to program and interact with the zone controller 200 as required.

Figure 2A:
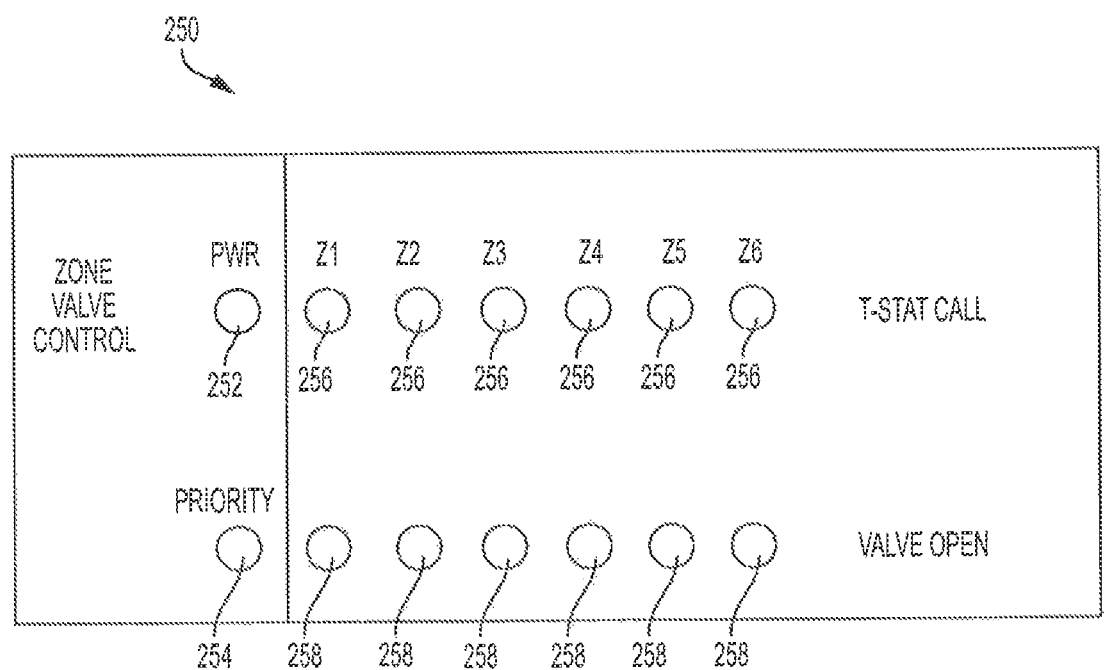
FIG. 2A is an indicator panel for a zone controller in accordance with the subject disclosure.

Referring now to FIG. 2A, an indicator panel 250 of a zone controller 200 with six zones is shown. The indicator panel 250 may be part of the zone controller display or otherwise incorporated into a zone controller. The indicator panel 250 includes a series of lights to provide easy review of the status of the zone controller 200. The indicator panel 250 includes a power LED 252 that turns green when the zone controller has power and is powered on. A priority LED 254 turns green when zone 1 turns on and the priority dip switch (not shown) is selected. Priority is typically selected when Zone 1 is used for the DHW heat exchanger. Preferably, only Zone 1 has the option to be set for priority operation which is as follows: a call for heat in Zone 1 when Zone 1 has priority selected will result in the zone control turning off the distribution of heat to Zones 2, 3 and 4 (e.g., the non-priority zones). As a result, the full boiler heating output is directed to the DHW heat exchanger and provides the fastest response to a DHW load. Such a priority function could also be used for one or more of the zones/space heating as well.

Additionally, for each zone, there is a T-stat call LED 256 turns green to indicate that the associated zone's thermostat is calling for heat. Also for each zone, a valve open LED 258 turns green to indicate that the associated zone's valve is actuated open.

The following flow charts herein illustrate the structure or the logic of the present technology, possibly as embodied in program software for execution on the processor 220 of the zone controller 200. Those skilled in the art will appreciate that the flow charts illustrate the structures of the program software or code elements, which may include logic circuits on an integrated circuit, that function according to the present technology. As such, the present technology may be practiced by a machine component that renders the program software in a form that instructs a processor to perform a sequence of function steps corresponding to those shown in the flow charts and equivalents. Preferably, the hardware to accomplish the steps is specialized equipment particularly created for the purpose.

Figure 3:
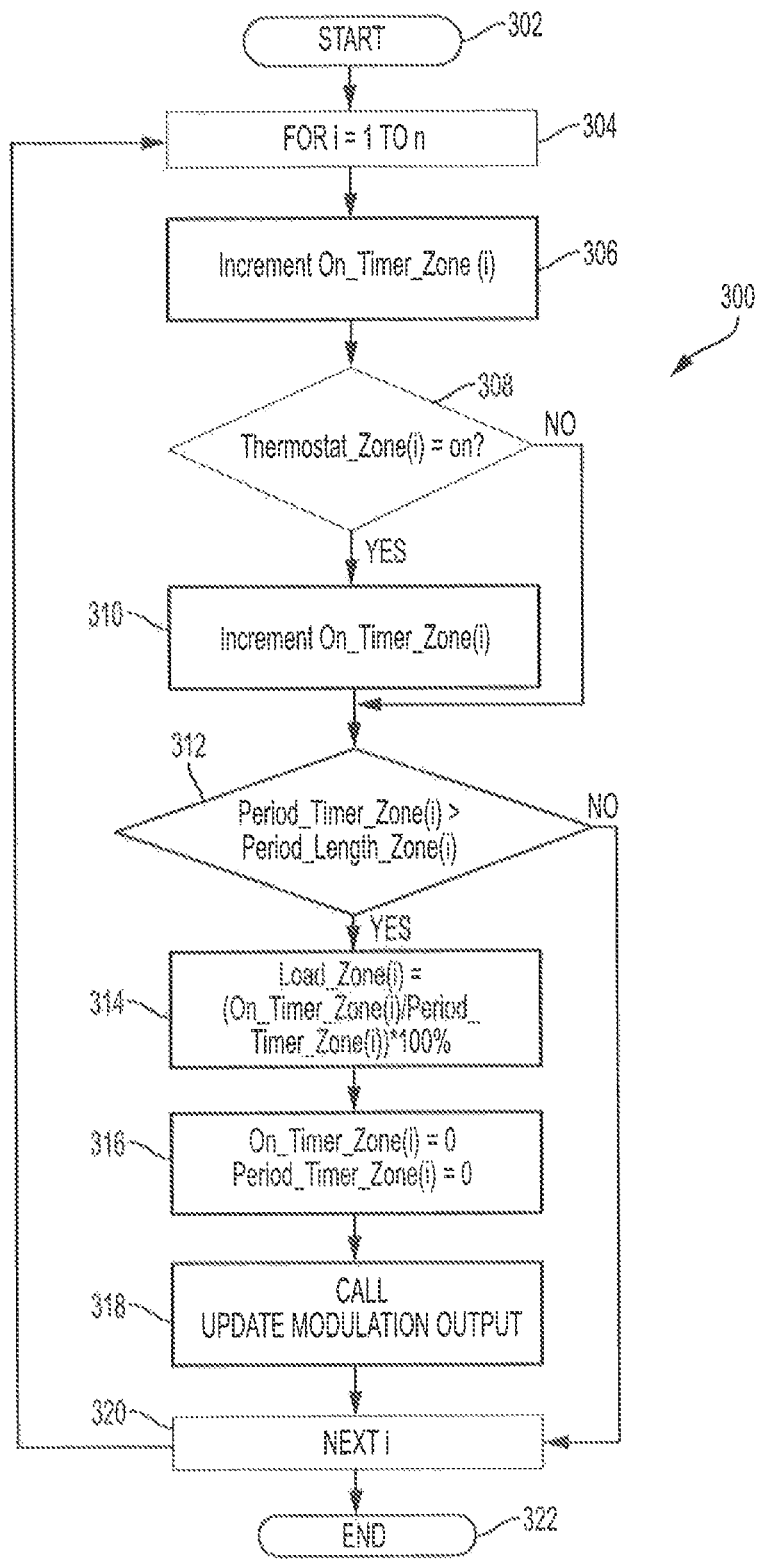
FIG. 3 is a flowchart depicting a process for calculating percent duty cycle as part of a process for providing hydronic heat in accordance with the subject technology.

Referring now to FIG. 3, there is illustrated a flowchart depicting a process 300 for calculating percent duty cycle as part of a process for providing hydronic heat in accordance with the subject technology. At step 302, the process of the flowchart begins. The flowchart begins under ongoing operation circumstances as opposed to an initial start-up condition. At step 304, a loop is initiated for an area where the variable "i" is used to denote the zone number. At step 306, a time counter, Period_Timer_Zone(i), is incremented for the corresponding zone. The Period_Timer_Zone(i) is used for zone(i) to accumulate the on-time and off-time of zone(i).

At step 308, the zone controller 200 checks whether the thermostat 118 for the pertinent area has a status of "on" or "off." "On" meaning that the thermostat 118 is calling for heat and "off" meaning that the thermostat is not calling for heat. If the thermostat status is on, an on-time counter for that zone, On_Timer_Zone(i), is incremented at step 310. Otherwise, no change is made to the On_Timer_Zone(i) by the process 300 proceeding from step 308 to step 312.

Still referring to FIG. 3, the process 300 is designed to collect on-time and off-time data over a set time period for each area. The set time period, Period_Length_Zone(i), can be set to a default number, entered by the user, calculated by an algorithm, or obtained by some other source, for example, through a WiFi signal. The Period_Length_Zone(i) can be, and typically is, different for each zone.

It is envisioned that, to the extent possible, the set time periods for each zone reflect a thermostat cycle that is typical for the heating system in normal operation. This is in contrast to the thermostat cycles which occur during night setback or during recovery from night setback. Further, high thermal mass zones (e.g., radiant floors) will typically have longer set time periods than lower thermal mass zones (e.g., baseboards or fan-coils). A set time period that is too short will result in a more responsive algorithm, but runs the risk of collecting data over a time period which does not reflect an average thermostat cycle. A set time period that is long has the advantage of more accurately reflecting a typical thermostat cycle, but runs the risk of reacting slowly to full on or full off conditions. In one embodiment, the set time period is initially set to 1.5 hours and subject to change (manually or automatically) or additional modification based on past history and/or performance.

At step 312 of FIG. 3, the zone controller 200 checks the time counter, Period_Timer_Zone(i), against the set time period for that area, Period_Length_Zone(i). If the time counter, Period_Timer_Zone(i), has not exceeded the set time period, Period_Length_Zone(i), the process 300 moves to step 320. At step 320, the value of "i" is increased by one, and the process returns to step 304.

At step 312, if the Period_Timer_Zone(i) has not exceeded the set time period, the process 300 proceeds to step 314 to calculate the Load_Zone(i). The zone controller 200 calculates the percent duty cycle for that area, Load_Zone(i), using an accumulation of on-time of the thermostat 118 of the respective zone, On_Time_Zone(i). The percent duty cycle value is a percentage equal to the proportion of the total amount of time the thermostat in that area had a status of "on" over the set time period for that zone. This is represented as an equation as $$\text{Load\_Zone}(i) = (\text{On\_Timer\_Zone}(i)/\text{Period\_Timer\_Zone}(i)) * 100\%.$$

At step 316, the on-time counter, On_Timer_Zone(i), and time counter, Period_Timer_Zone(i), are reset to a value of zero. At step 318, the memory 222 is updated to reflect the newly calculated percent duty cycle value for the pertinent area, Load_Zone(i).

At step 320, the value of "i" is increased by one, and the process returns to step 304. Once steps 304-318 have been repeated for each value of "i" from 1 to "n", the process 300 is complete and may end at step 322. It is envisioned that the process 300 of FIG. 3 will be repeated at least until a percent duty cycle has been calculated for each area. Alternatively, the process 300 of FIG. 3 may be repeated periodically or substantially continuously, such as once every second, so that new percent duty cycle values for each area are regularly calculated.

As can be seen, the process 300 calculates the duty cycle for each zone, wherein the sampling window for each zone may be different. The process 300 also triggers calculation of the maximum zone load and updates the boiler modulation signal whenever a new zone duty cycle is calculated for any zone. Overall, all existing zone boxes simply provide an end-switch contact to a boiler so that if any thermostat turns on, the boiler is enabled. Unless a reset control is present on the boiler, when the boiler is enabled, the boiler runs up to design temperature. This then leads up to the advantage that the subject technology reduces the boiler temperature when loads are low and consequently energy is saved. Even if the boiler has an outdoor reset control installed, the subject technology can outperform the outdoor reset because the response is to actual zone feedback rather than outdoor temperature, which is only a proxy for load.

Figure 4:
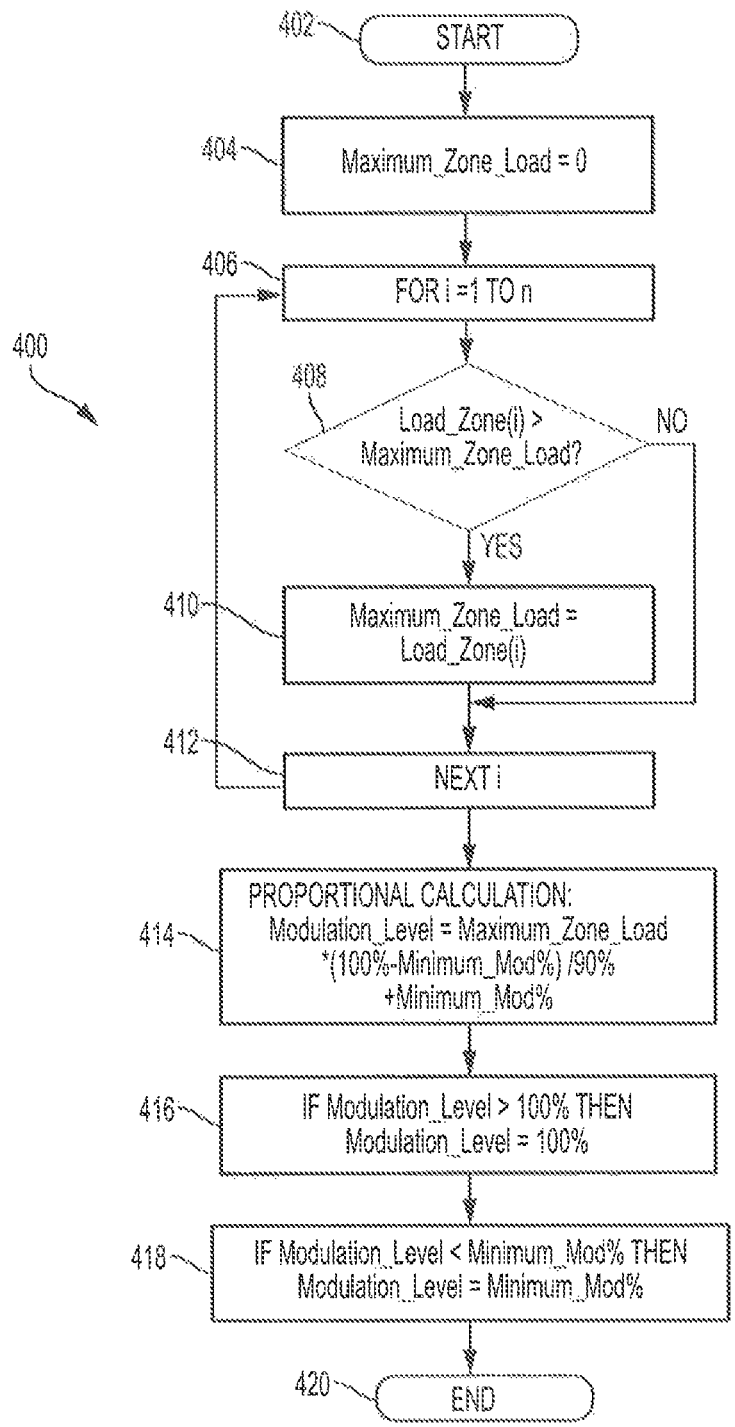
FIG. 4 is a flowchart depicting a process of calculating greatest percentage duty cycle and modulating a boiler based on a direct proportional calculation for a hydronic heating system in accordance with the subject technology.

Referring now to FIG. 4, a flowchart depicting a process 400 of calculating a greatest percentage duty cycle as part of a process for providing hydronic heat in accordance with the subject technology is shown. The process 400 also updates the modulated output level based on the largest zone load amongst the zones. It is envisioned that prior to the start of the process 400 in FIG. 4, the process 300 of FIG. 3 will be carried out one or more times, such that a percent duty cycle has been determined for the zones. The process 400 of FIG. 4 calculates the greatest percent duty cycle of any zone that is part of the hydronic heating process of the subject technology.

At step 402, the process 400 begins and, preferably, runs continuously under ongoing operation. Several variables are used and calculated in the process 400. Load_Zone(i) is the percentage duty cycle for a thermostat 118 in zone (i), which is updated every Period_Length_Zone(i) seconds. Maximum_Zone_Load is the largest of Load_Zone(i). Modulation_Level is the modulation level that is output to the modulating boiler 102. Minimum_Mod % is the minimum allowed value for the Modulation_Level, which could be a fixed value or a user adjustment. It is noted that the variable "i" is consistently used to represent the zone number. However, the variable "i" is not a parameter between FIG. 3 and the call to FIG. 4. Any value of FIG. 3 which gets an updated Load_Zone(i) (i.e., zone period elapsed), will result in a "call" to FIG. 4, which then determines the possibly new maximum value and new modulation level.

It is possible that the "call" to FIG. 4 from FIG. 3 could be made multiple times. For example, if more than one thermostat finishes its operating period in the same second. Although this is unlikely, it is not harmful. Alternatively, FIG. 4 is not called but rather simply periodically run even when the underlying data is unchanged.

At step 404, the Maximum_Zone_Load is set to zero. As the process 400 of FIG. 4 is carried out, the Maximum- _Zone_Load will be set equal to the highest percent duty cycle of any of the zones analyzed.

At step 406, a loop is initiated for each measured zone ("n" zones with "i=1 to n") within the building, wherein "i" is initially set to 1. At step 408, the percent duty cycle of each zone, Load_Zone(i) is compared to the current value for percent maximum duty cycle, Maximum_Zone_Load. If the Load_Zone(i) is greater than the Maximum_Zone_Load, the process 400 proceeds to step 410 where the Maximum_Zone_Load is set as equal to Load_Zone(i). Otherwise at step 408, the process 400 proceeds to step 412.

At step 412, the process 400 loops back to step 406 for each area number "i" up through the total number of zones, "n". Thus, steps 406 through 412 are repeated for each controlled zone. Upon passing through this loop for each zone, the Maximum_Zone_Load is equal to the greatest percent duty cycle of all the given zones.

Still referring to FIG. 4, the process 400 also modulates a boiler based on a direct proportional calculation in accordance with the subject technology. It is envisioned that the process 400 will be carried out anytime a new maximum percent duty cycle (i.e., Maximum_Zone_Load) is calculated (e.g., anytime a new Load_Zone(i) is calculated in FIG. 3). In brief overview, the process 400 also determines a modulation level for a boiler which is proportional to the maximum percent duty cycle. The modulation level is relied on by the boiler to determine what percentage of maximum operational power the boiler should be run at. Thus, in times when less heat is needed, a lower modulation level will cause the boiler to run at a lower temperature, thereby providing increased energy efficiency and comfort to the user.

At step 414, the process 400 calculates a Modulation_Level for the modulating boiler 102. The Modulation_Level is equal to the Maximum_Zone_Load multiplied by the difference of 100% and the Minimum_Mod % divided by 90% plus the Minimum_Mod %. As noted above, the Minimum_Mod % represents the smallest allowed value for the Modulation_Level for the boiler 102, which can be set to a default number, entered by the user, calculated by an algorithm and the like. Since Modulation_Level is a percentage meant to reduce the maximum operational power of the boiler 102, the calculated Modulation_Level should not exceed 100%. Thus, at step 416, if the Modulation_Level is greater than 100%, the modulation level is set to equal 100%. It is envisioned that the calculation targets a Modulation_Level of 100% when the Maximum_Zone_Load is only 90%. As such, it is expected that the zone always have a small amount of off-time. When the zone is 100% on, the resulting signal is not really useful. Some off-time allows calculating the period and determining how cold the zone is (e.g., 100% on could mean very cold or close to target and all conditions in between). Targeting 90% reduces the circumstances when the zone load will go to 100%.

At step 418, if the Modulation_Level is less than the Minimum_Mod %, then the Modulation_Level is set equal to the Minimum Modulation %. The zone controller 200 then sends a signal of a strength corresponding to the calculated modulation level to the modulating boiler 102. Thus, the modulating boiler 102 operates at a factor of a maximum operation temperature in accordance with the strength of the signal received. At step 420, the modulating boiler is operating at a new output level and the process 400 ends.

There are a number of ways to calculate the Modulation_Level based on the input of the Modulation_Zone_Load. For example, the linear calculation of FIG. 4 can be used. Alternatively, a floating calculation can be used (see FIG. 5) or a PI calculation (shown as an alternative path in FIG. 5). Preferably, there is a setting to select the preferred calculation.

Figure 5:
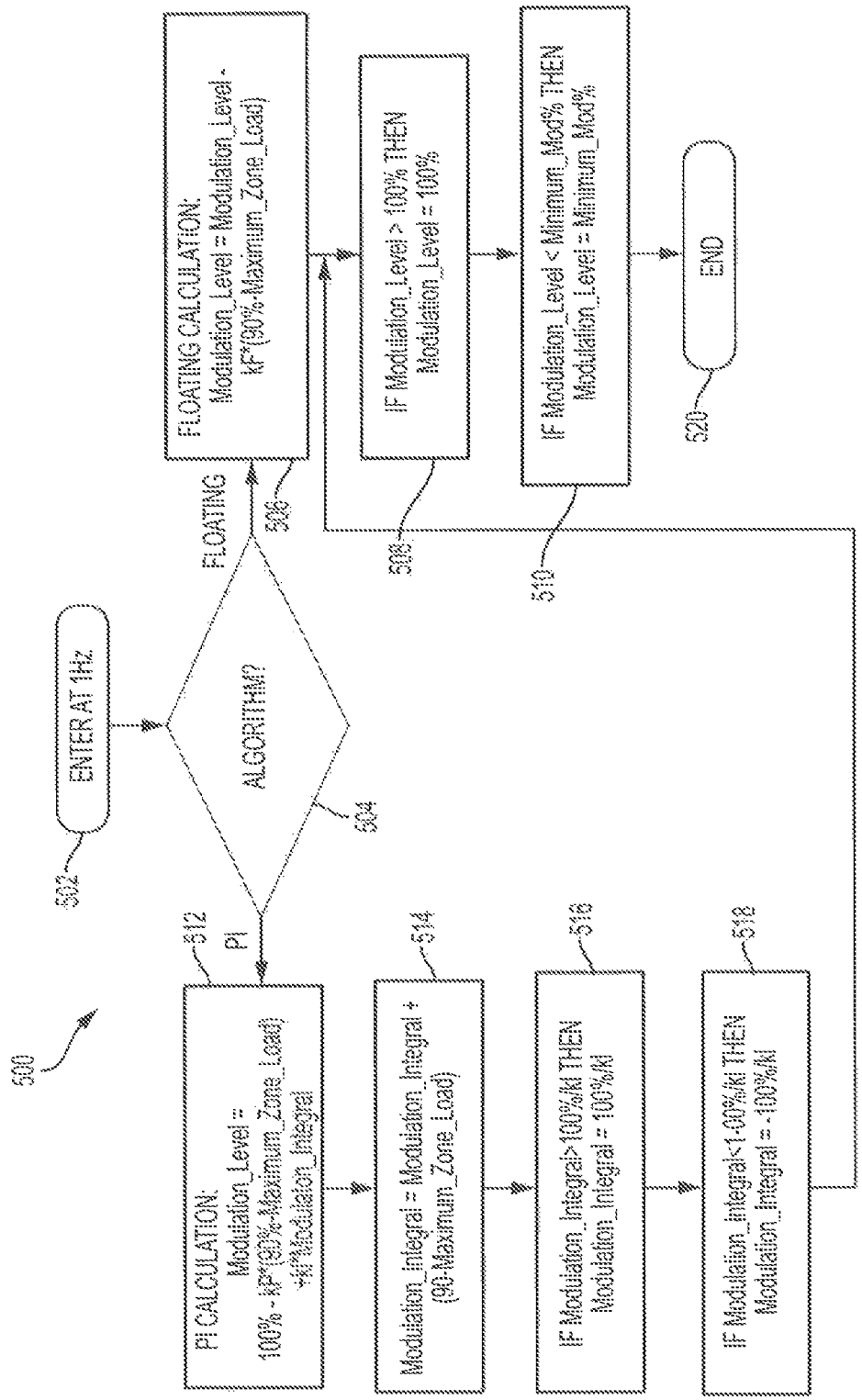
FIG. 5 is a flowchart depicting a process of modulating a boiler based on a floating output algorithm and a proportional integral (PI) output algorithm in accordance with the subject technology.

Referring now to FIG. 5, a flowchart depicting a process 500 of modulating a boiler based on a floating output algorithm and a proportion-integral (PI) output algorithm in accordance with the subject technology is shown. It is envisioned that the process 500 is carried out substantially continuously, such as once every second, or after a maximum percent duty cycle has been calculated by the process 400 of FIG. 4.

In brief overview, the process 500 determines a modulation level for a boiler based on a floating calculation and a PI calculation. The process 500 relies on a number of variables, the values for which can be set by default, entered by the user, calculated by an algorithm, or obtained by some other source, for example, through a WiFi signal. Again, "i" is a variable that represents the zone number and the other similarly named variables are similarly defined. Load_Zone (i) is the percent duty cycle thermostat connected to Zone(i), which is updated to a new value every Zone_Period_Length (i). Maximum_Zone_Load is the largest of the Load-Zone(i) values. "kF" is a gain that determines how much change the current value of the Maximum_Zone_Load can make to the Modulation_Level in the floating calculation. "kP" is the gain for the proportional component in the PI calculation. "kI" is the gain for the integral component in the PI calculation. Modulation_Integral is the accumulated difference between 90% and the Maximum_Zone_Load. Modulation_Level is the modulation level that is output to the modulating boiler. Minimum_Mod % is the minimum allowed value for the Modulation_Level. The Minimum_Mod % could be a fixed value or adjusted by the user.

At step 502, the process 500 begins and may then proceed down one of two branches to step 506 for a floating calculation or to step 512 for a PI calculation depending upon user selection at step 504.

When the floating calculation is selected by the user, the process 500 proceeds to step 506. The floating calculation requires that a modulation level has been either calculated or input prior to the first time the floating calculation is utilized. The Modulation_Level is calculated and equal to a prior Modulation_Level minus the product of kF times the difference of 90% minus the Maximum_Zone_Load. In other words, the Modulation_Level is initialized at 0% and then each pass through the process 500 will increase or decrease the Modulation_Level by an amount proportional to the difference between 90% and the Maximum_Zone_Load (limited of course to a value between 0 and 100%). "kP" is the gain for the proportional component in the PI calculation. "kI" is the gain for the integral component in the PI calculation.

At step 508, if the Modulation_Level is greater than 100%, the Modulation_Level is set to 100% and the process 500 proceeds to step 510 to determine if the Modulation_Level is below the Minimum_Mod %. If the Modulation_Level is below the Minimum_Mod %, then the Modulation_Level is set equal to the Minimum_Mod % and the floating calculation branch of the process 500 is complete. The zone controller 200 sends a signal to the modulating boiler 102, wherein the signal strength is based on the newly calculated Modulation_Level. The process 500 then ends at step 520.

As can be seen, the factor of the maximum percent duty cycle is determined by subtracting the maximum percent duty cycle from 90%. The purpose of the 90% value is to ensure that the boiler is running at a high enough operational level so that the thermostats in each zone cycle off for at least some amount of time during each set time period, thus resulting in a thermostat cycle that more closely reflects a normal operation cycle. One skilled in the art would recognize that the value 90% could be lower or higher, depending on desired system performance.

Still referring to process 500 of FIG. 5, in the PI branch, a modulation level is determined based on a PI calculation starting at step 512 in which the Modulation_Level is calculated as set forth below $$\text{Modulation\_Level} = 100\% - kP*(90\% - \text{the Maximum\_Zone\_Load}) + (kI*\text{Modulation\_Integral}).$$

At step 514, the Modulation_Integral is set queal to the pre-existing Modulation_Integral plus the difference of 90 minus the Maximum_Zone_Load. At step 516, if the Modulation_Integral is greater than 100% divided by kI, then the Modulation_Integral is set to 100% divided by kI and the process 500 proceeds to step 518. At step 518, the zone controller 200 determines if the Modulation_Integral is less than −100 divided by kI. If so, the Modulation_Integral is set equal to −100 divided by kI and the process 500 proceeds to perform steps 508 and 510 as described above. The zone controller 200 sends a signal to the modulating boiler 102, wherein the signal strength is based on the newly calculated Modulation_Integral and the process 500 then ends at step 520.

As can be seen, the subject technology controls boiler operation so the user is comfortable and the heat is delivered in an efficient manner. The variables are typically selected so that the maximum output of the modulating boiler is achieved before the maximum zone load is equal to 100%. In short, a bias for a boiler running slightly hot is typically preferred as the response is relatively better when heat is called for.

Further, the subject technology works with programmable smart thermostats. For example, when the thermostats are programmed for automatic evening setback and morning recovery, the time periods around setback and recovery can be shortened to improve performance. Additionally, the heating system 100 can adaptively learn how the user and external parameters impact the call for heat and dynamically adjust the noted parameters.

Figure 6:
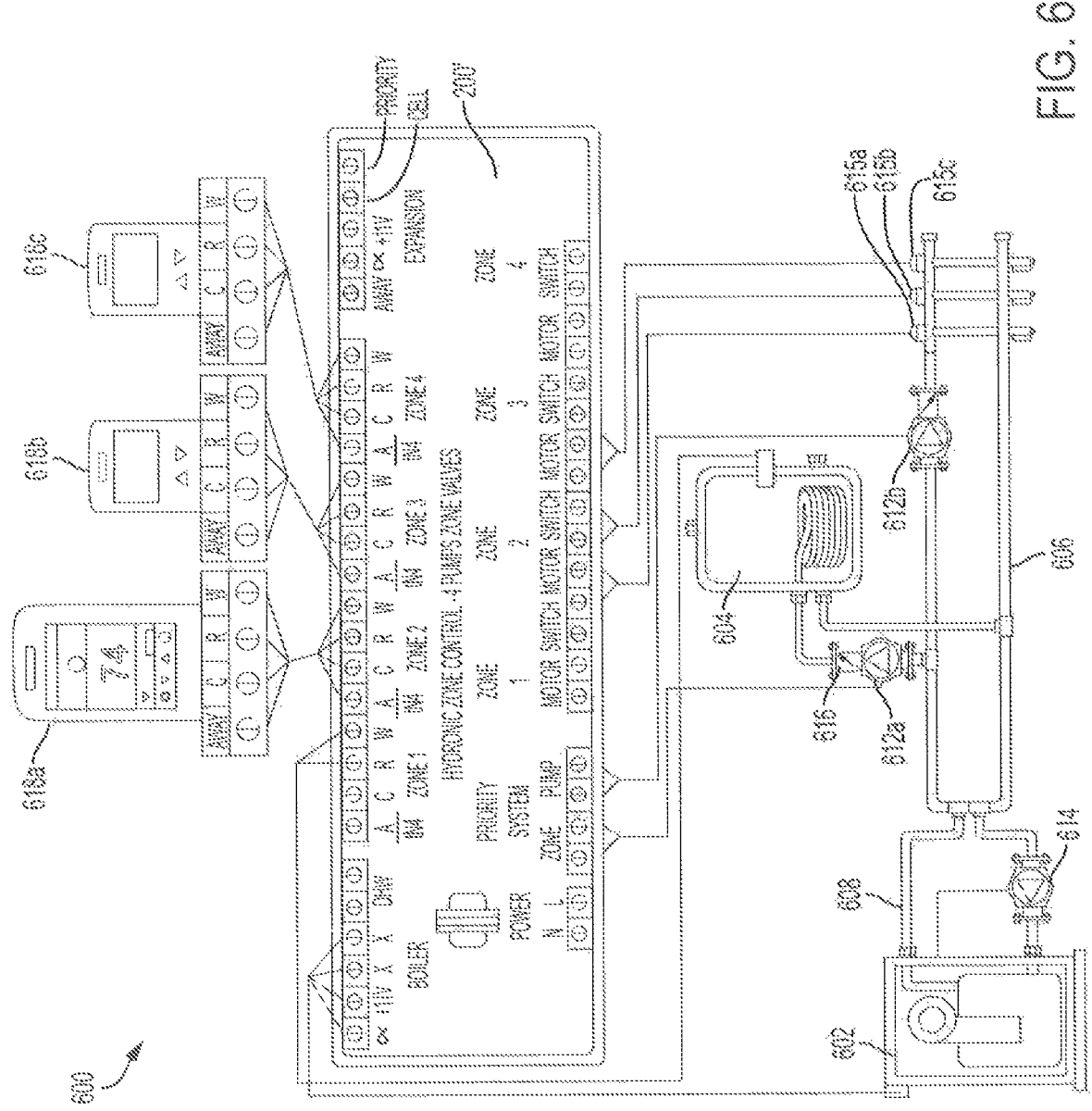
FIG. 6 is a diagram showing an alternative hydronic heating system in accordance with the subject technology.
Figure 7A:
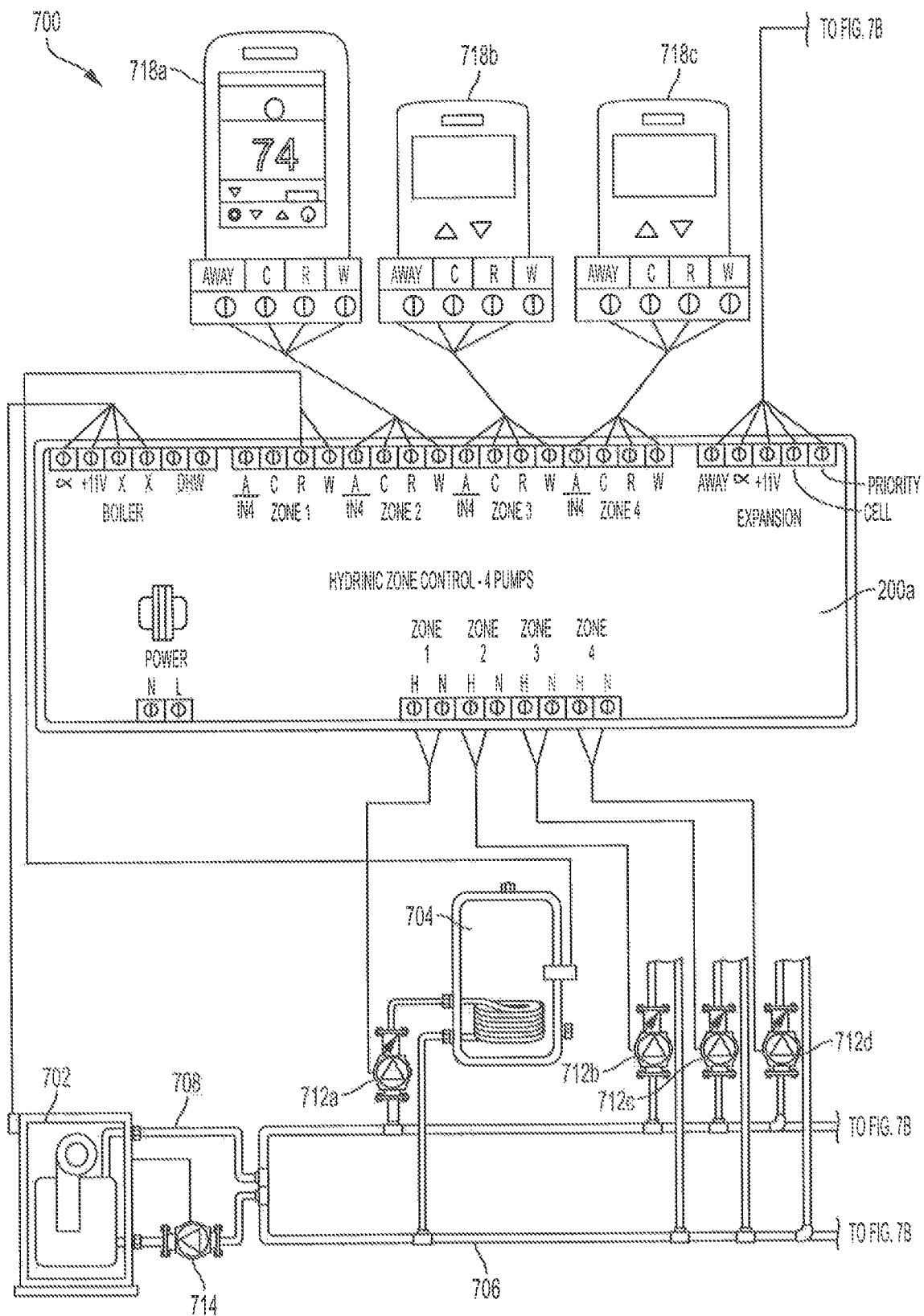
FIGS. 7A and 7B are a diagram showing a seven zone hydronic heating system in accordance with the subject technology.
Figure 7B:
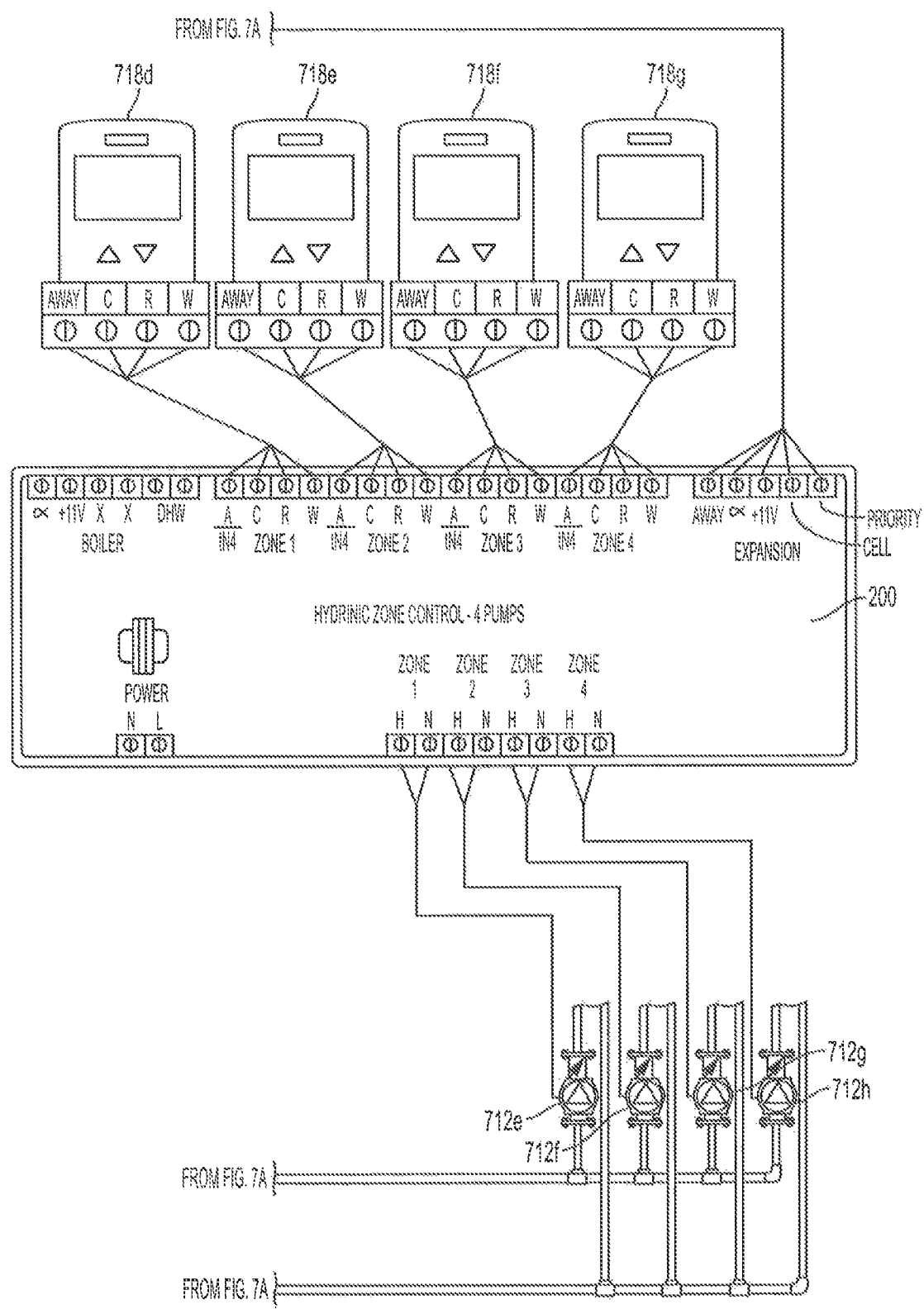

Referring now to FIG. 6, a diagram shows an alternative hydronic heating system 600 in accordance with the subject technology. Similar elements to those described in connection with above-described embodiments are indicated with the like reference numbers in the 600 series. Many elements are essentially the same as those of the foregoing embodiments and, thus, are not further described herein. The primary difference between the hydronic heating system 600 and the hydronic heating system 100 is the usage of a single pump 612b for zones 2-4. Each zone 2-4 has a valve 615a-c to selectively open and close the respective flowpath, the valves 615a-c being controlled by the zone controller 200'. As such, when flow is required to on or more of the zones 2-4, the pump 612b runs and the respective valve 615a-c opens The subject technology is also scalable as shown in the seven zone hydronic heating system 700 of FIGS. 7A and 7B. Again like elements are given 700 series reference numerals. The primary difference between the hydronic heating system 700 and the hydronic heating system 100 is the deployment of two controllers 200a, 200b so that controller 200b can control four additional zones. Additional pumps 712e-h and thermostats 718d-g are also used.

Figure 8A:
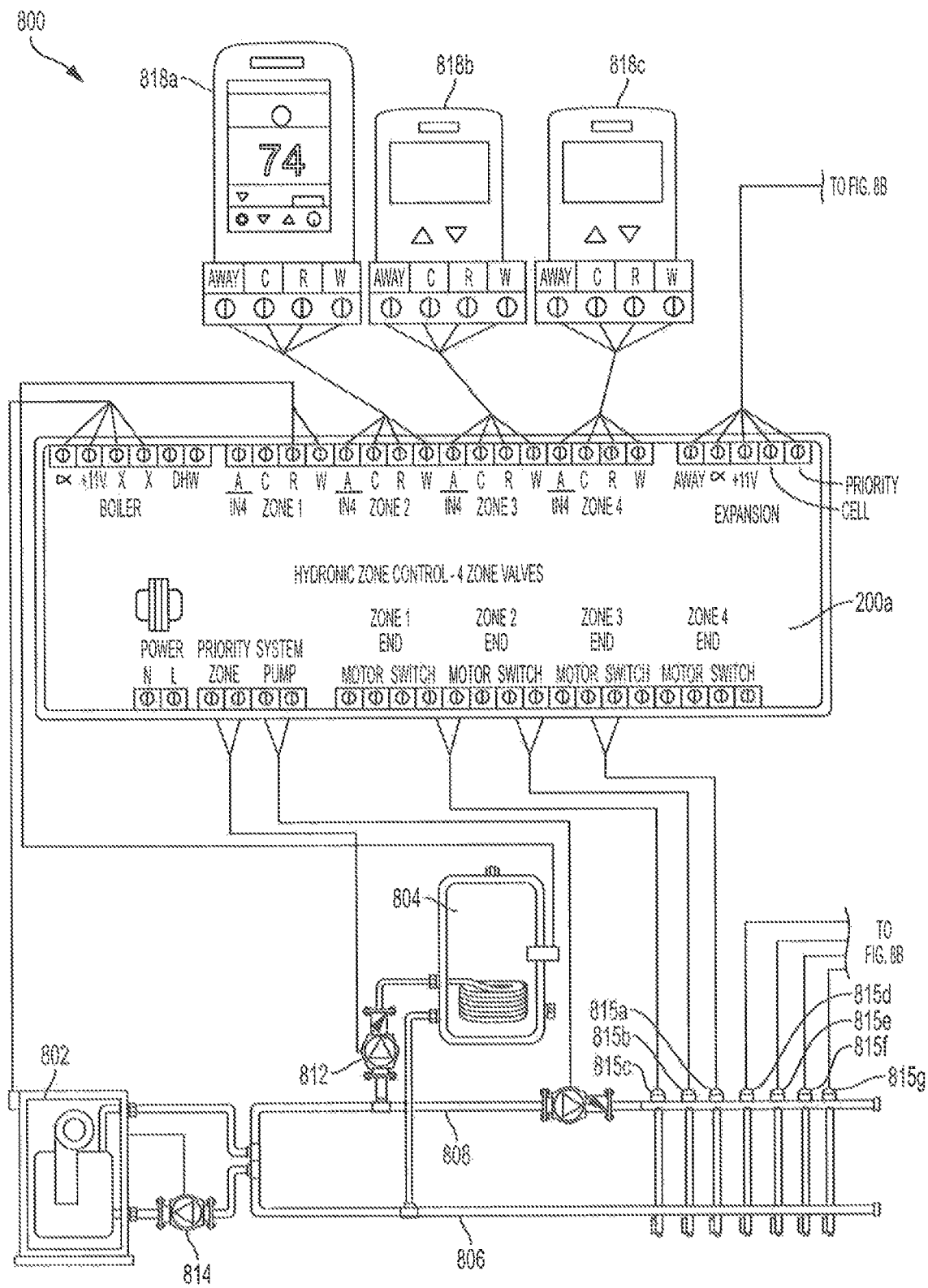
FIGS. 8A and 8B are a diagram showing an alternative seven zone hydronic heating system in accordance with the subject technology.
Figure 8B:
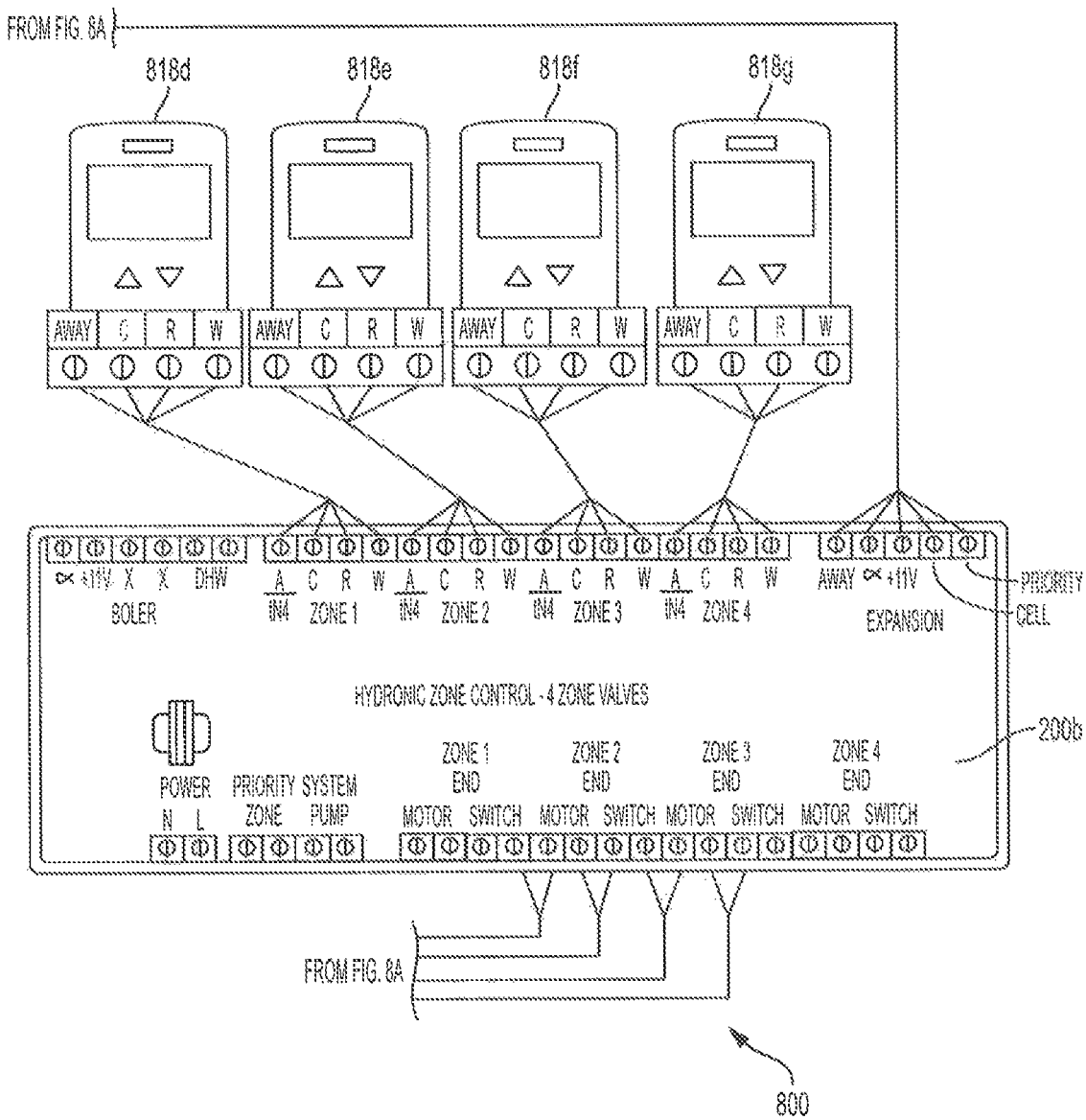

Referring now to FIGS. 8A and 8B, another alternative seven zone hydronic heating system 800 is shown. Similar to FIG. 6, the hydronic heating system 800 of FIGS. 8A and 8B utilizes a single pump 812b for a plurality of zones. And, similarly to FIGS. 7A and 7B, the hydronic heating system 800 uses two zone controllers 200 connected to valves 815a-g and thermostats 718a-f for controlling the additional zones.

Still another embodiment, such as shown in FIGS. 8A and 8B, utilizes flow control valves 815a-g that regulate (i.e., modulate) the flow of fluid to the zones as a means of additional control. By modulating the water flow to each zone, the performance of the heating system can be further tuned to for efficient and responsive performance. For example, if a zone is rarely on (e.g., a low duty cycle), the flow to the zone can be minimized to increase the duty cycle to a more efficient level.

It is noted that the diagram 800 of FIGS. 8A and 8B is similar to the diagram 600 of FIG. 6 except with more zone valves. In another embodiment, the heating system has a mixing valve with an actuator with accepts a 0-10 Vdc input paired with a non-modulating boiler to reduce temperatures to the zones. As a result, heat loss between the mixing valves and the zones can be reduced and smaller temperature swings in the heating terminals.

Regarding zone period calculations, a Zone_Load calculation and an update of the Modulation_Output can be user selected. A preferred predetermined limit of 1.5 hours is set as a maximum zone period. However, depending upon the particular components in use, a different predetermined limit can be user-selected or preprogrammed.

Figure 9:
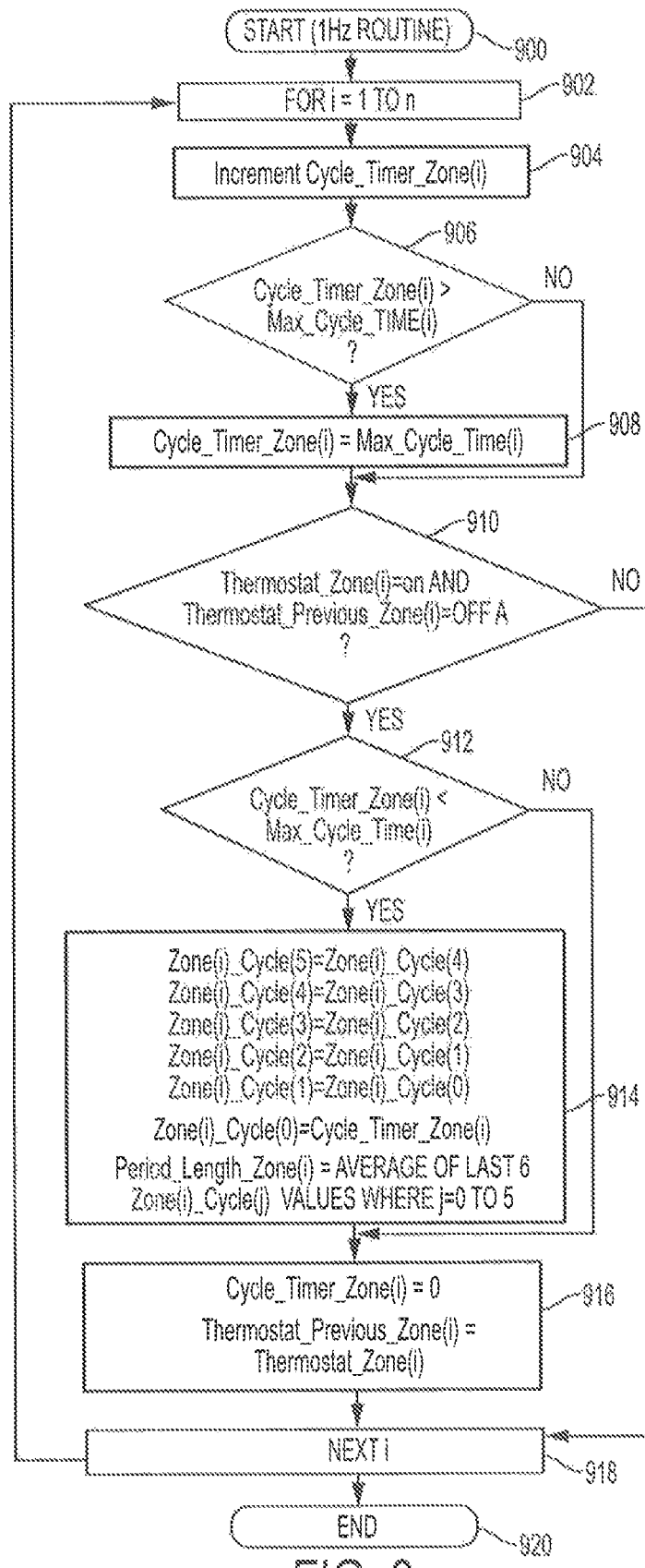
FIG. 9 is a flowchart depicting a process of calculating a normal operating period for each zone and discarding new cycle times if the new cycle time exceeds a predetermined parameter in accordance with the subject technology.

Referring now to FIG. 9, a flowchart depicting a process 900 of calculating a normal operating period for each zone and discarding new cycle times if the new cycle time exceeds a predetermined parameter. The normal operating period is an average of an array of the last "n" measured cycles (e.g., 6 cycles in this example). The Max_Cycle_Time(i) is the high limit for any Zone(i) cycle time. The Max_Cycle_Time(i) can be learned per zone or based on a user setting. The Max_Cycle_Time(i) prevents going into setback or recovery from setback from unduly influencing the Zone(i) period calculation. A typical Max_Cycle_Time (i) is 1.5 hours for a heating system. In the process 900, Cycle_Timer_Zone(i) is a counter used to accumulate the current on/off cycle time for Zone(i). The Cycle_Timer_Zone(i) is reset whenever the thermostat Zone(i) goes from an "off" state to an "on" state.

Thermostat_Zone(i) is the current on/off state of the thermostat connected to Zone(i) with "on" meaning that the thermostat is calling for heat and "off" meaning that the thermostat is not calling for heat. Thermostat_Previous_Zone(i) is the on/off state of the thermostat connected to Zone(i) from the last pass through the process 900, which is used to determine when Zone(i) goes from off to on. Zone(i)_Cycle_Time(j) is an array of the most recently captured cycle times for Zone(i). Period_Length_Zone(i) is the length of the period used for Zone(i) to accumulate the on-time and off-time of Zone(i). The Period_Length_Zone (i) is equal to the average of the last 6 cycle times held in the Zone(i)_Cycle_Time(j) array in this example.

At step 900, the process 900 starts as a 1 Hz routine and proceeds to step 902, where the process 900 is set up to run through a series of steps for each of the "n" zones starting from the first zone. At step 904, the process 900 increments the Cycle_Timer_Zone(i). At step 906, if the Cycle_

Timer_Zone(i) is greater than the Max_Cycle_Time(i), the process 900 proceeds to step 908. At step 906, if the Cycle_Timer_Zone(i) is less than or equal to the Max_Cycle_Time(i), the process 900 proceeds to step 910.

At step 908, the Cycle_Timer_Zone(i) is set to the Max_Cycle_Time(i). At step 910, the process 900 determines if the Thermostat_Zone(i) is on and if the Thermostat_Previous_Zone(i) is off. If not, the process 900 moves to step 918, where the process 900 iterates back to step 902 for the next zone. At step 910, if the Thermostat_Zone(i) is on and if the Thermostat_Previous_Zone(i) is off, then the process 900 proceeds to step 912.

At step 912, the process 900 determines if the Cycle_Timer_Zone(i) less than the Max_Cycle_Time(i). If not, the process 900 moves to step 916. If the Cycle_Timer_Zone(i) is less than the Max_Cycle_Time(i), the process 900 proceeds to step 914.

At step 914, the process 900 calculates the normal operating period for the respective zone by averaging the array of the last "n" measured cycles (where n=6 in this example). At step 916, the process 900 sets the Cycle_Timer_Zone(i) to zero while setting the Thermostat_Previous_Zone(i) to the Thermostat_Zone(i). At step 918, the process 900 increments the counter "i" to iterate through all the zones. Once all the zones have been completed, the process 900 ends at step 920.

Figure 10:
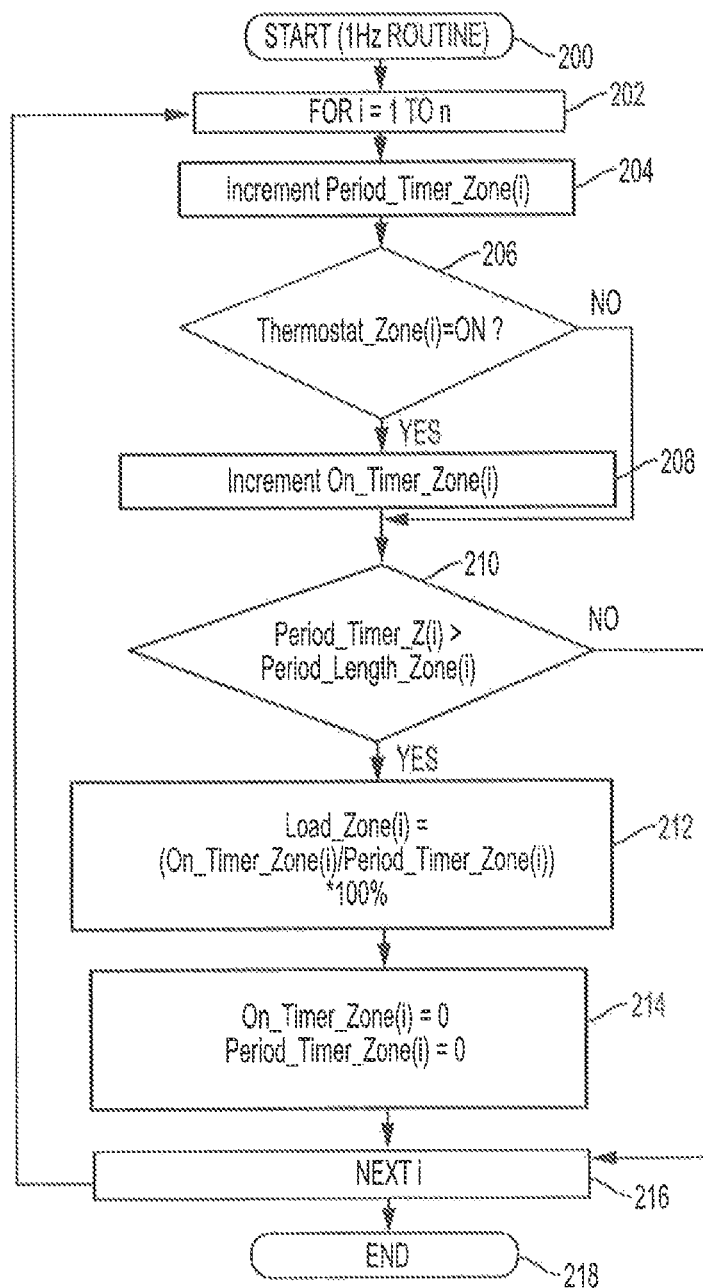
FIG. 10 is a flowchart depicting a process of calculating the zone (thermostat) duty cycle from a number of zones where the sampling window for each zone may be different in accordance with the subject technology.

Referring now to FIG. 10, a flowchart depicting a process of calculating the zone (thermostat) duty cycle from a number of zones where the sampling window for each zone may be different is shown. Again, "i" is the zone number (e.g., 1 to n) so that that process can be applied to a system with a variable number of zones calling for heat via an on/off thermostat.

Thermostat_Zone(i) is the current on/off state of the thermostat connected to Zone(i) with "on" meaning that the thermostat is calling for heat and "off" meaning that the thermostat is not calling for heat. Period_Timer_Zone(i) is the timer used for Zone(i) to accumulate the on-time and off-time of Zone(i). Period_Length_Zone(i) is the length of the period used for Zone(i) to accumulate the on-time and off-time of Zone(i), which can be different for each zone. The On_Timer)Zone(i) is an accumulation of on-time connected to Zone(i). Load_Zone(i) is the percentage of duty cycle for a thermostat connected to Zone(i), which is updated to a new value every Zone Period_Length(i) seconds.

At step 200, the process of FIG. 10 begins. At step 202, the process is set up to run through a series of steps for each of the "n" zones starting from the first zone. At step 204, the process increments the Period_Timer_Zone(i). At step 206, if the Thermostat_Zone(i) is on, the process proceeds to step 208. At step 206, if the Thermo_Zone(i) is off, the process proceeds to step 210. At step 208, the On_Timer_Zone(i) is incremented.

At step 210, the process determines if the Period_Timer_Zone(i) is greater than the Period_Length_Zone(i). If not, the process moves to step 216, where the process iterates back to step 202 for the next zone. At step 910, if the Period_Timer_Zone(i) is greater, then the process proceeds to step 212. At step 212, the Load_Zone(i) is determined as follows:

$$Load\_Zone(i) = (On\text{-}Timer\_Zone(i)/Period\_Timer\_Zone(i)) * 100\%.$$

At step 214, the On_Timer_Zone(i) and Period_Timer_Zone(i) are both set to zero. At step 216, the counter "i" is incremented and the process returns to step 202 to iterate through the rest of the zones.

Figure 11:
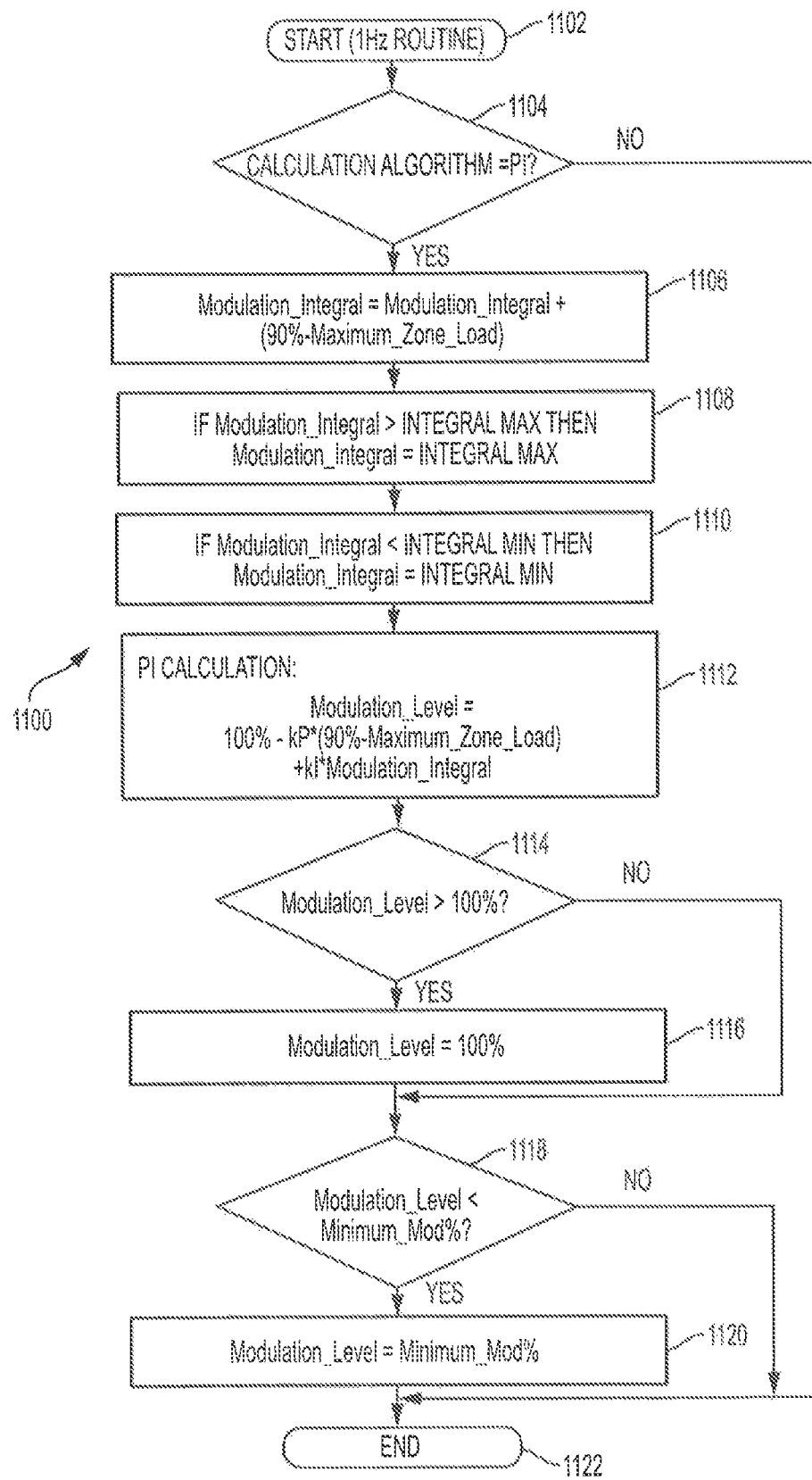
FIG. 11 is a flowchart depicting a process of determining the largest zone load amongst the zones in accordance with the subject technology.

Referring now to FIG. 11, flowcharts depicting alternative processes updating the modulated output level are shown. These flowcharts use similar variables as used in the process 400 of FIG. 4. Thus, the same variables are not setforth again. The process 1100 of FIG. 11 uses the Maximum_Zone_Load. At step 1102, the process 1100 begins. Initially, the process 1100 determines if the calculation algorithm is the selected PI calculation at step 1104. If not, the process 1100 proceeds to step 1122, which ends the process 1100. If so, the process 1100 proceeds to step 1106.

At step 1106, the Modulation_Integral is set equal to the Modulation_Integral plus the difference of 90% and the Maximum_Zone_Load. At step 1108, if the Modulation_Integral is greater than the maximum, then the Modulation_Integral is set equal to the Integral Max. At step 1110, if the Modulation_Integral is less than the minimum, then the Modulation_Integral is set equal to the Integral_Min. At step 1112, the PI calculation is performed as follows:

$$Modulation\_Level = 100\% - kP*(90\% - Maximum\_Zone\_Load) + kI*Modulation\_Integral.$$

At step 1114, if the Modulation_Level is greater than 100%, then the process 1100 proceeds to step 1116 to set the Modulation_Level to 100%. If the Modulation_Level is not greater than 100%, then the process 1100 proceeds to step 1118. At step 1118, if the Modulation_Level is less than the Minimum_Mod %, then the process 1100 proceeds to step 1120 where the Modulation_Level is set to the Minimum_Mod %. At step 1118, if the Modulation_Level is not less than the Minimum_Mod %, then the process 1100 proceeds to step 1122, where the process 1100 ends.

Figure 12:
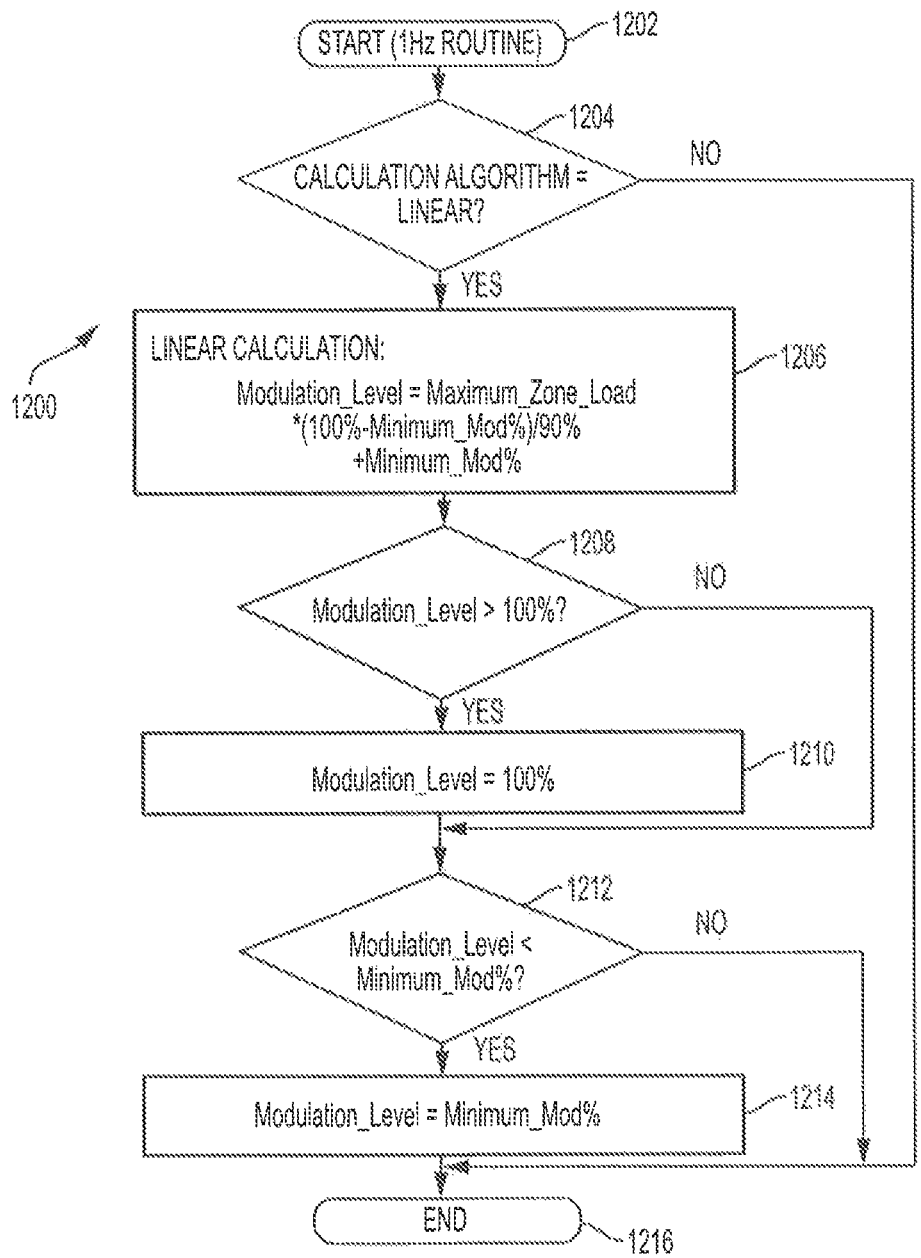
FIG. 12 is a flowchart depicting a process of updating the modulated output level using a linear calculation operating on the Maximum_Zone_Load in accordance with the subject technology.

Referring particularly to FIG. 12, a process 1200 for a linear calculation operating on the Maximum_Zone_Load in accordance with the subject technology is shown. At step 1202, the process 1200 begins. Initially, the process 1200 determines if the calculation algorithm is the selected PI calculation at step 1204. If not, the process 1200 proceeds to step 1216, which ends the process 1200. If so, the process 1200 proceeds to step 1206.

At step 1206, the Modulation_Level is performed as follows:

$$Modulation\_Level = (Maximum\_Zone\_Load)*(100\% - Minimum\_Mod\ \%)/90 + Minimum\_Mod\ \%.$$

At step 1208, if the Modulation_Level is greater than 100%, then the process 1200 proceeds to step 1210 to set the Modulation_Level to 100%. If the Modulation_Level is not greater than 100%, then the process 1200 proceeds to step 1212. At step 1212, if the Modulation_Level is less than the Minimum_Mod %, then the process 1200 proceeds to step 1214 where the Modulation_Level is set to the Minimum_Mod %. At step 1212, if the Modulation_Level is not less than the Minimum_Mod %, then the process 1200 proceeds to step 1216, where the process 1200 ends.

Figure 13:
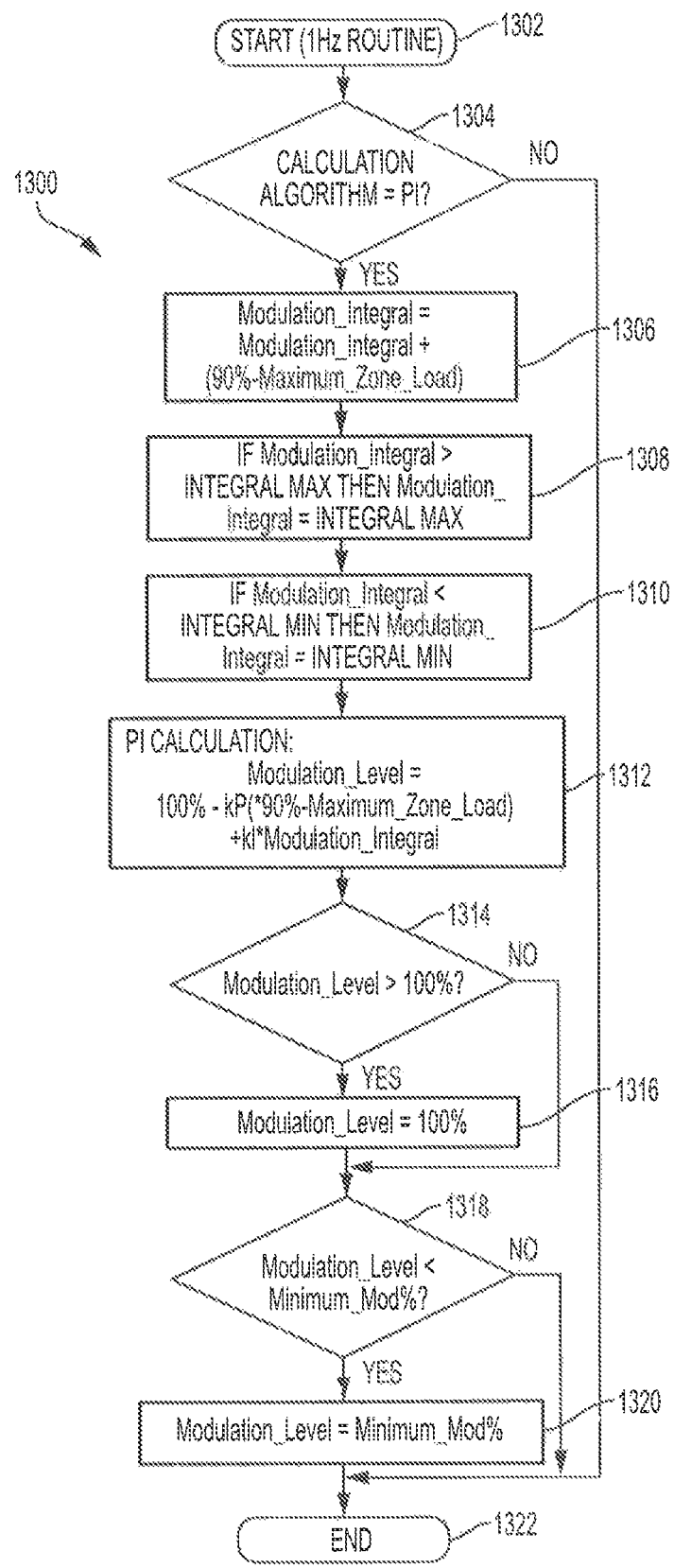
FIG. 13 is a flowchart depicting a process of updating the modulated output level using a PI calculation operating on the Maximum_Zone_Load in accordance with the subject technology.

Referring now to FIG. 13, a flowchart 1300 depicting a process of updating the modulated output level using a PI calculation operating on the Maximum_Zone_Load in accordance with the subject technology is shown. Initially, the process 1300 determines if the calculation algorithm is the selected PI calculation at step 1304. If not, the process 1300 proceeds to step 1322, which ends the process 1300. If so, the process 1300 proceeds to step 1306.

At step 1306, the Modulation_Integral is set equal to the Modulation_Integral+(90%−Maximum_Zone_Load). At step 1308, if the Modulation_Integral is greater than the integral maximum, then the Modulation_Integral is set to the integral maximum. At step 1310, if the Modulation_Integral is less than the integral minimum, then the Modulation_Integral is set to the integral minimum.

At step 1312, the Modulation_Level is calculated as follows:

$$\text{Modulation\_Level} = 100\% - kP*(90\% - \text{Maximum\_Zone\_Load}) + kI*\text{Modulation\_Integral}.$$

At step 1314, if the Modulation_Level is greater than 100%, then the process 1300 proceeds to step 1316 to set the Modulation_Level to 100%. If the Modulation_Level is not greater than 100%, then the process 1300 proceeds to step 1318. At step 1318, if the Modulation_Level is less than the Minimum_Mod %, then the process 1300 proceeds to step 1320 where the Modulation_Level is set to the Minimum_Mod %. At step 1318, if the Modulation_Level is not less than the Minimum_Mod %, then the process 1300 proceeds to step 1322, where the process 1300 ends.

Figure 14:
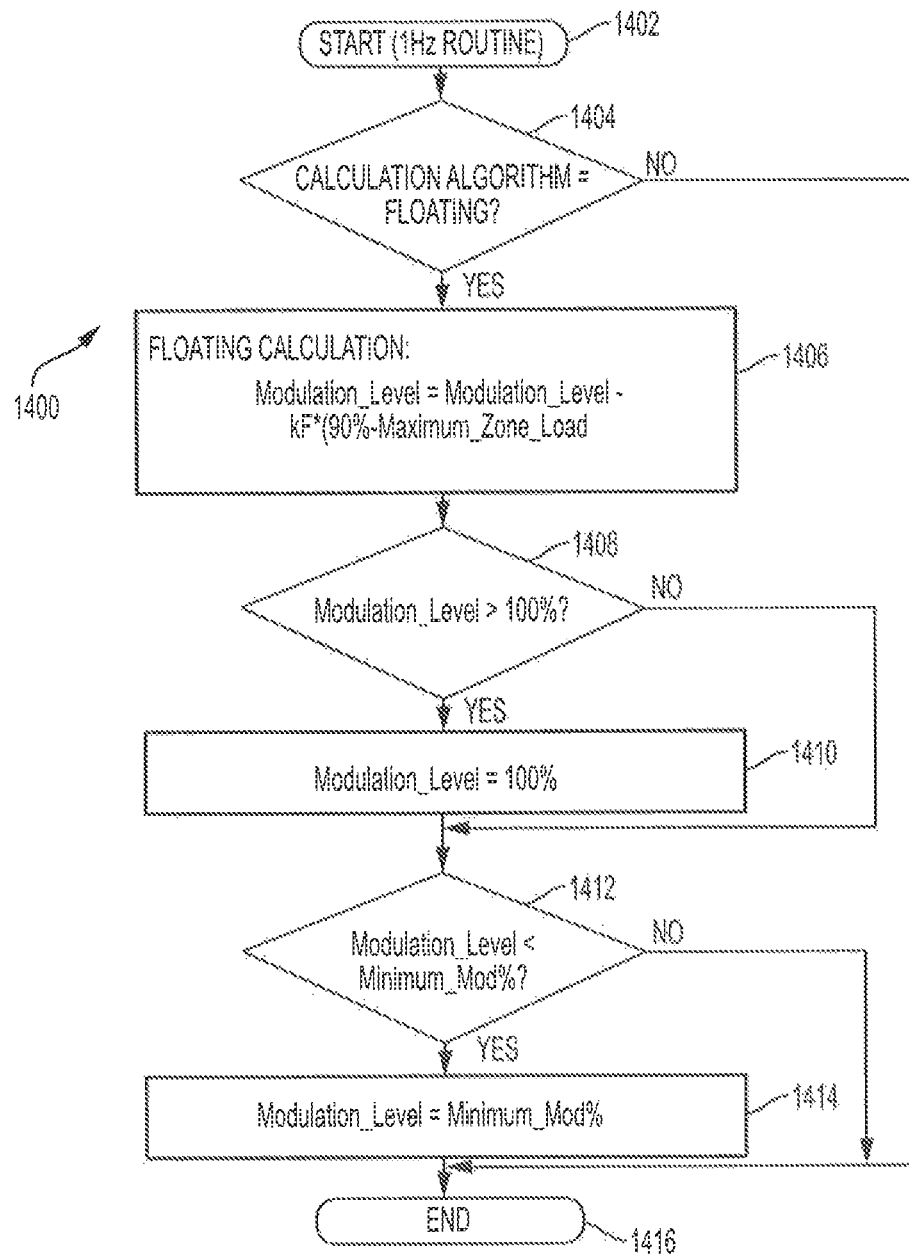
FIG. 14 is a flowchart depicting a process of updating the modulated output level using a floating calculation operating on the Maximum_Zone_Load in accordance with the subject technology.

Referring now to FIG. 14, a flowchart depicting a process 1400 of updating the modulated output level using a floating calculation operating on the Maximum_Zone_Load in accordance with the subject technology is shown in which kF is a gain that determines how much change the current value of the Maximum_Zone_Load can make to the Modulation_Level in the floating calculation. Typically, gains are user selected based on empirical performance data. Initially, the process 1400 starts at step 1402 and determines if the calculation algorithm is the selected floating calculation at step 1404. If not, the process 1400 proceeds to step 1416, which ends the process 1400. If so, the process 1400 proceeds to step 1406.

At step 1406, the Modulation_Level is calculated as follows:

$$\text{Modulation\_Level} = \text{Modulation\_Level} - kF*(90\% - \text{Maximum\_Zone\_Load}).$$

At step 1408, if the Modulation_Level is greater than 100%, then the process 1400 proceeds to step 1410 to set the Modulation_Level to 100%. If the Modulation_Level is not greater than 100% at step 1408, then the process 1400 proceeds to step 1412. At step 1412, if the Modulation_Level is less than the Minimum_Mod %, then the process 1400 proceeds to step 1414 where the Modulation_Level is set to the Minimum_Mod %. At step 1412, if the Modulation_Level is not less than the Minimum_Mod %, then the process 1400 proceeds to step 1416, where the process 1400 ends.

As can be seen, several methods can be utilized to calculate the Modulation_Level. Additionally, several methods can be used, then an average taken to determine the actual Modulation_Level.

As one of ordinary skill in the art would understand upon review of the subject disclosure, a heating system in accordance with the subject technology would reduce the modulating boiler operating temperatures and, thus, reduce energy consumption under reduced zone load conditions. Further, the boiler would more typically operate below the condensing temperature resulting in good boiler efficiency. The zone controller may learn a setback schedule based on repetition of long off times and long on times. Based on the setback schedule, the operation can be modified as noted above even when used with non-communicating thermostats (e.g., thermostats that do not communicate with the zone controller).

The subject technology is equally applicable to other fields such as a cooling system. The cooling system may include dampers to vary airflow in various zones. The dampers may selectively block flow or even have variable flow settings. A cooling unit (e.g., air conditioner) may include a modulating compressor, which is controlled by a zone controller similarly as to above, so that the cooling unit runs an optimal amount to not only maintain comfortable temperature but provide improved humidity control as well. Further, the fan speed may also be adjusted to provide additional control. In one embodiment, the thermostat with the longest on-time and the shortest off-time drives the overall control signal. Expansion zone controls may perform their own calculations which are communicated to the master zone controller. The highest zone signal may be send to the modulating boiler. At initialization, a maximum output may be used. When the thermostat calls for heat too frequently, the boiler target operating point can be raised.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, processors, valves, pumps and the like) shown as distinct for purposes of illustration may be incorporated within other functional elements in a particular implementation.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A heating system for a building having a first zone with a first thermostat and a first heat distribution element and a second zone with a second thermostat and a second heat distribution element, the heating system comprising:
   a modulating boiler;
   at least one pump fluidly connected to the modulating boiler and the heat distribution elements; and
   a zone controller in communication with the modulating boiler, the at least one pump, the first thermostat, and the second thermostat, the zone controller including:
   memory storing an instruction set and data related to the thermostats, a plurality of duty cycles, a plurality of time periods, and a maximum zone load; and
   a processor in communication with the memory for running the instruction set, wherein the zone controller is operative to:
   calculate a first duty cycle for the first zone based on a first time period;
   calculate a second duty cycle for the second zone based on a second time period;
   determine a maximum zone load, which is a greater of the first duty cycle and the second duty cycle;
   provide a modulating signal to the modulating boiler based on the maximum zone load, wherein the modulating boiler operates at a target temperature using the modulating signal; and
   calculate the time period for each zone based on empirical data and a new maximum zone load whenever a new individual zone load is calculated, wherein the modulating signal is updated based on the new maximum zone load.

2. A heating system as recited in claim 1, wherein the zone controller is further operative to modulate a flow to each of the zones.

3. A heating system as recited in claim 1, wherein the zone controller is further operative to calculate each duty cycle, wherein a sampling window for each zone is different.

4. A heating system as recited in claim 1, wherein the first duty cycle is based on signals from the first thermostat and the second duty cycle is based on signals from the second thermostat.

5. A heating system as recited in claim 1, wherein: the first time period is an average thermostat cycling frequency for the first zone; and the second time period is an average thermostat cycling frequency for the second zone.

6. A heating system as recited in claim 1, wherein the first and second time periods are adjusted during recovery from setback.

7. A heating system as recited in claim 1, wherein the first and second time periods are adjusted during approach of setback.

8. A hydronic heating system for a building having a first area and a second area comprising:
  memory storing an instruction set and data related to a plurality of thermostat statuses, a plurality of duty cycles, a plurality of time periods, and a maximum duty cycle; and
  a processor for running the instruction set, the processor being in communication
  with the memory,
  wherein the processor is operative to:
  receive and store a plurality of thermostat statuses indicating whether a plurality of thermostats in a plurality of areas are on or off;
  calculate a plurality of duty cycles based on the plurality of thermostat statuses over the plurality of time periods;
  calculate a maximum duty cycle based on a greatest of the plurality of duty cycles;
  calculate a plurality of water supply values for each of the plurality of areas
  based on the duty cycle for each area and the maximum duty cycle;
  modulate a plurality of water supplies between a modulating boiler and each of the plurality of areas using a flow control valve for each area based on the respective water supply value, such that the water supplied to each area is a factor of the water supply value for said area;
  determine a target temperature for the modulating boiler based on the maximum duty cycle,
  wherein the target temperature is selected so that a maximum output of the modulating boiler is achieved before a maximum zone load for either of the first or second areas is equal to 100% for creating a hot bias to improve response when heat is called for.

9. A method for utilizing a modulating boiler to heat a building having a plurality of areas having a plurality of thermostats comprising the steps of:
  (a) putting each thermostat in each area in communication with a modulating boiler such that each thermostat can send a call for heat to the modulating boiler when a temperature in the area of said thermostat falls below a parameter;
  (b) setting a time period for an area;
  (c) determining a duty cycle for the area of step (b), wherein the duty cycle is based on-a total time the thermostat was calling for heat from the modulating boiler;
  (d) repeating steps (b)-(c) for each of the plurality of areas;
  (e) determining a maximum duty cycle based on a greatest of the duty cycles for each area;
  (f) determining a target temperature for the modulating boiler based on the maximum duty cycle; and
  (g) running the modulating boiler at or near the target temperature,
    wherein at least one of the thermostats is programmable for automatic evening setback and morning recovery, and further comprising the step of shortening the time periods around setback and recovery for improving performance.

10. A method as recited in claim 9, wherein the target temperature is selected so that a maximum output of the modulating boiler is achieved before a maximum zone load for any of the plurality of areas is equal to 100% for creating a hot bias to improve response when heat is called for.

* * * * *